US012633181B2

(12) United States Patent
Kobayashi et al.

(10) Patent No.: US 12,633,181 B2
(45) Date of Patent: May 19, 2026

(54) VEHICLE CONTROL SYSTEM AND METHOD OF PERFORMING AUTONOMOUS RETREAT TRAVEL OPERATION

(71) Applicant: DENSO TEN Limited, Kobe (JP)

(72) Inventors: Shunsuke Kobayashi, Kobe (JP); Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 185 days.

(21) Appl. No.: 18/436,454

(22) Filed: Feb. 8, 2024

(65) Prior Publication Data

US 2024/0331466 A1 Oct. 3, 2024

(30) Foreign Application Priority Data

Mar. 30, 2023 (JP) .................................. 2023-056498

(51) Int. Cl.
| | |
|---|---|
| *G07C 5/08* | (2006.01) |
| *B60W 50/023* | (2012.01) |
| *B60W 50/14* | (2020.01) |
| *B60W 60/00* | (2020.01) |
| *B60Q 1/50* | (2006.01) |

(52) U.S. Cl.
CPC ......... *G07C 5/0816* (2013.01); *B60W 50/023* (2013.01); *B60W 50/14* (2013.01); *B60W 60/0015* (2020.02); *B60Q 1/507* (2022.05); *B60W 2510/244* (2013.01); *B60W 2554/406* (2020.02); *B60W 2555/20* (2020.02)

(58) Field of Classification Search
CPC .......................... G07C 5/0816; B60W 60/0015
See application file for complete search history.

(56) References Cited

U.S. PATENT DOCUMENTS

| | | | | |
|---|---|---|---|---|
| 8,319,662 B1* | 11/2012 | Bontemps | ............ | G08G 1/0955 |
| | | | | 340/908 |
| 12,086,165 B2* | 9/2024 | Liu | .......................... | G06F 18/20 |
| 2012/0158330 A1* | 6/2012 | Araki | .................... | H01M 10/48 |
| | | | | 702/63 |
| 2013/0103333 A1* | 4/2013 | Nishida | .............. | G01R 31/3842 |
| | | | | 702/63 |
| 2014/0062352 A1* | 3/2014 | Wang | ......................... | H02P 5/68 |
| | | | | 318/139 |

(Continued)

FOREIGN PATENT DOCUMENTS

| | | | |
|---|---|---|---|
| JP | 2010-111291 | A | 5/2010 |
| JP | 2017-063551 | A | 3/2017 |
| JP | 2022-098967 | A | 7/2022 |

*Primary Examiner* — Jess Whittington
(74) *Attorney, Agent, or Firm* — OLIFF PLC

(57) ABSTRACT

A control device includes: a controller mounted on a vehicle having an autonomous driving function and configured to execute fail-safe control by a backup power supply when a main power supply fails. The controller is configured to: in the fail-safe control, when a remaining charge level of the backup power supply decreases to or below a first threshold set in advance, execute a first notification to notify in advance an inside of the vehicle that the vehicle is likely to stop due to a shortage of the remaining charge level of the backup power supply; and when the remaining charge level of the backup power supply decreases to or below a second threshold that is smaller than the first threshold, execute a second notification to notify an outside of the vehicle that the vehicle stops.

19 Claims, 22 Drawing Sheets

| SOC OF BACKUP POWER SUPPLY | IN-VEHICLE NOTIFICATION INFORMATION | OUT-OF-VEHICLE NOTIFICATION INFORMATION |
|---|---|---|
| SOC > FIRST THRESHOLD A1 | NO | NO |
| SECOND THRESHOLD A2 < SOC ≤ FIRST THRESHOLD A1 | FIRST NOTIFICATION AND SO ON | FOURTH NOTIFICATION AND SO ON |
| SOC ≤ SECOND THRESHOLD A2 | THIRD NOTIFICATION AND SO ON | SECOND NOTIFICATION AND SO ON |

(56)          References Cited

U.S. PATENT DOCUMENTS

| | | | |
|---|---|---|---|
| 2014/0253043 A1* | 9/2014 | Cho | G08B 21/182 |
| | | | 320/134 |
| 2015/0066258 A1* | 3/2015 | Loftus | G01C 21/3469 |
| | | | 701/22 |
| 2015/0338849 A1* | 11/2015 | Nemec | G05D 1/0016 |
| 2017/0023945 A1* | 1/2017 | Cavalcanti | H05B 47/19 |
| 2017/0313241 A1* | 11/2017 | Wu | G08G 1/0955 |
| 2019/0197497 A1* | 6/2019 | Abari | G05D 1/0088 |
| 2019/0354111 A1* | 11/2019 | Cheng | G05D 1/0011 |
| 2021/0247778 A1* | 8/2021 | Miller | B60W 10/02 |
| 2022/0149454 A1* | 5/2022 | Wassmur | B60L 1/003 |
| 2023/0398834 A1* | 12/2023 | Williams | B60H 1/00735 |
| 2023/0399024 A1* | 12/2023 | Gross | B60W 50/029 |
| 2024/0369643 A1* | 11/2024 | Ishii | G01R 31/392 |
| 2025/0069026 A1* | 2/2025 | Liu | G06V 20/597 |

* cited by examiner (CONT.)

(FIG. 1 CONTINUED)
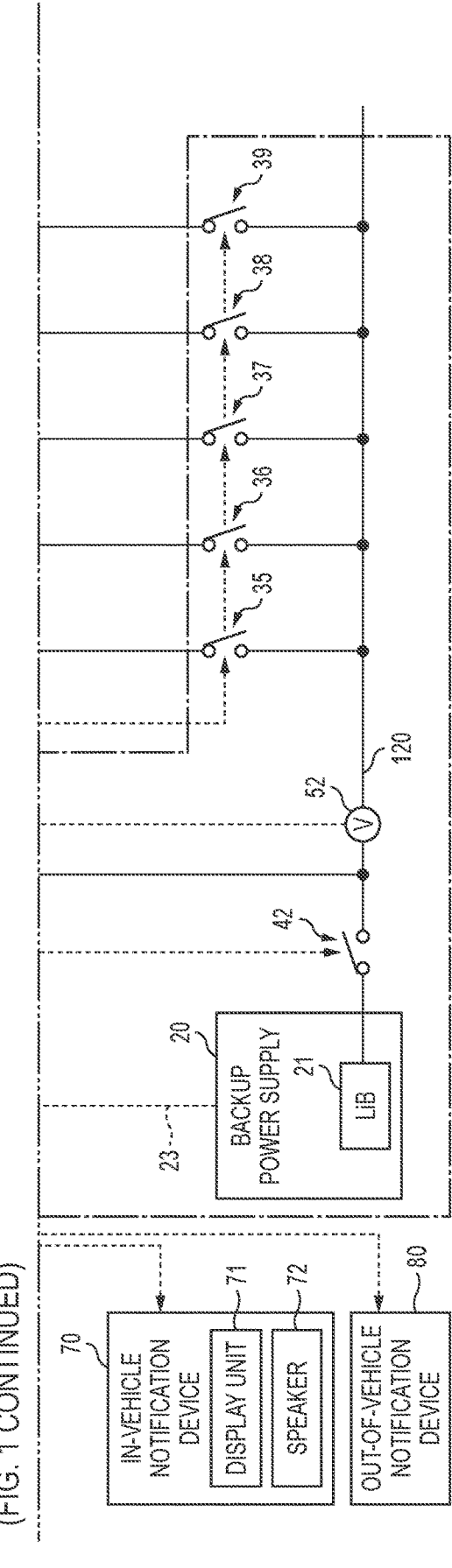

(FIG. 2 CONTINUED)
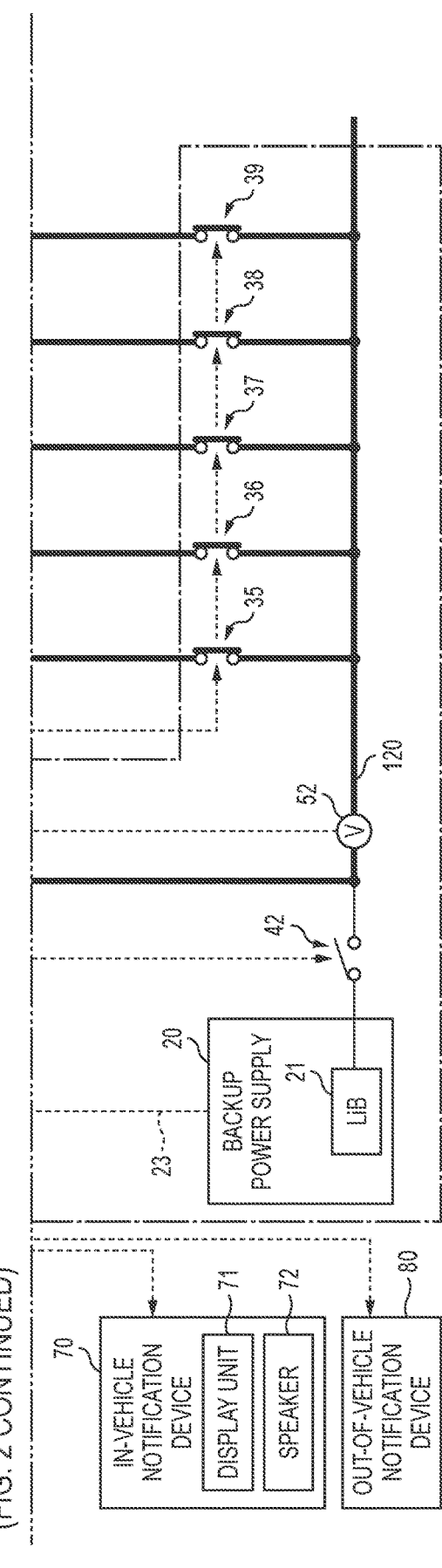

(FIG. 3 CONTINUED)
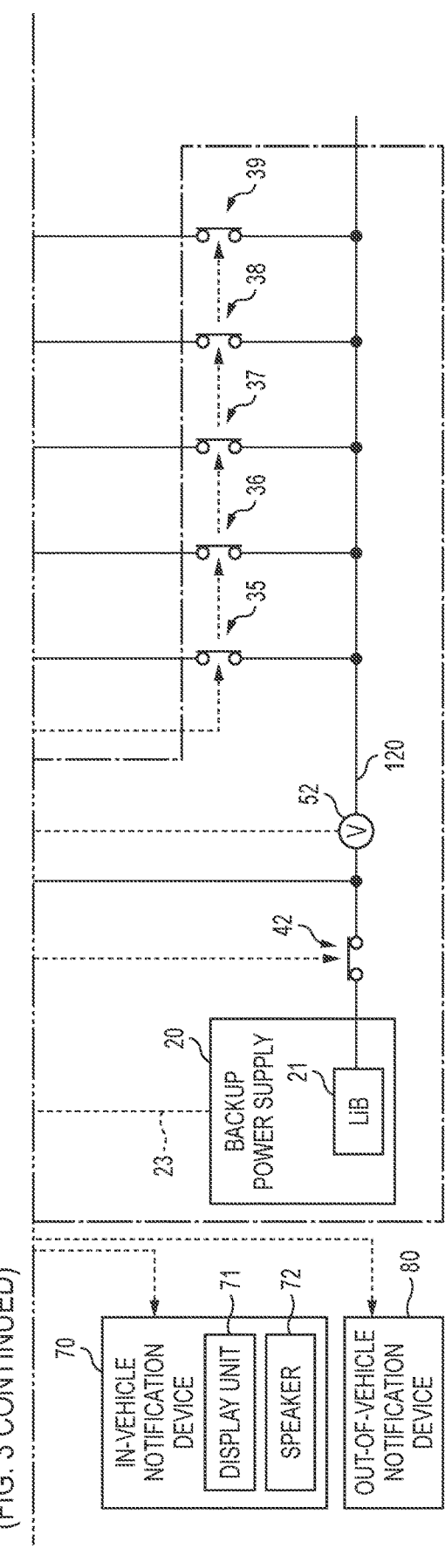

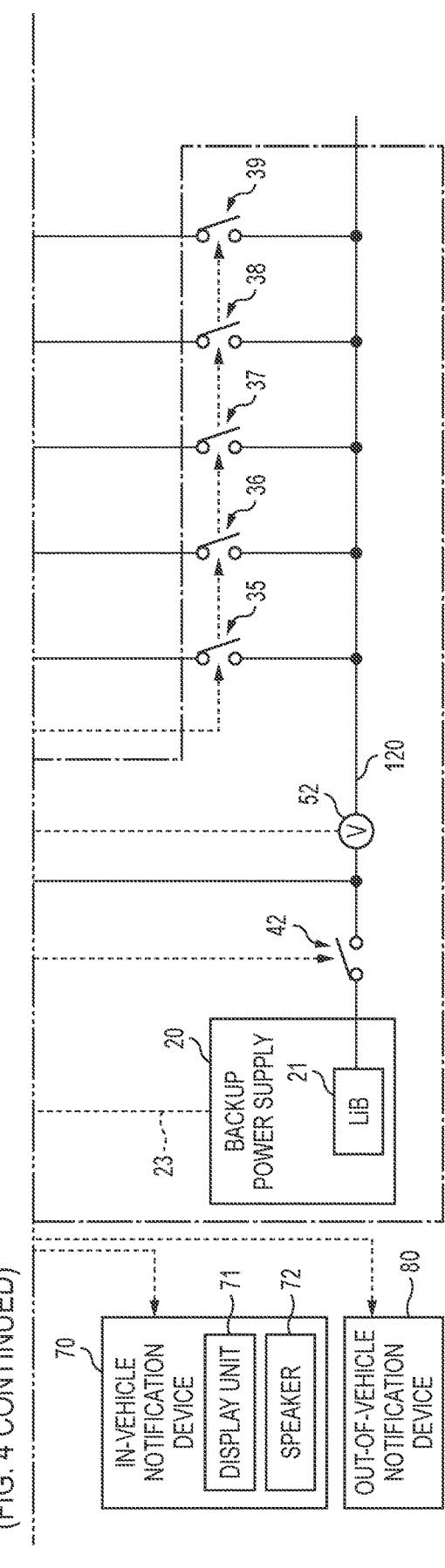
(FIG. 4 CONTINUED)

(FIG. 5 CONTINUED)
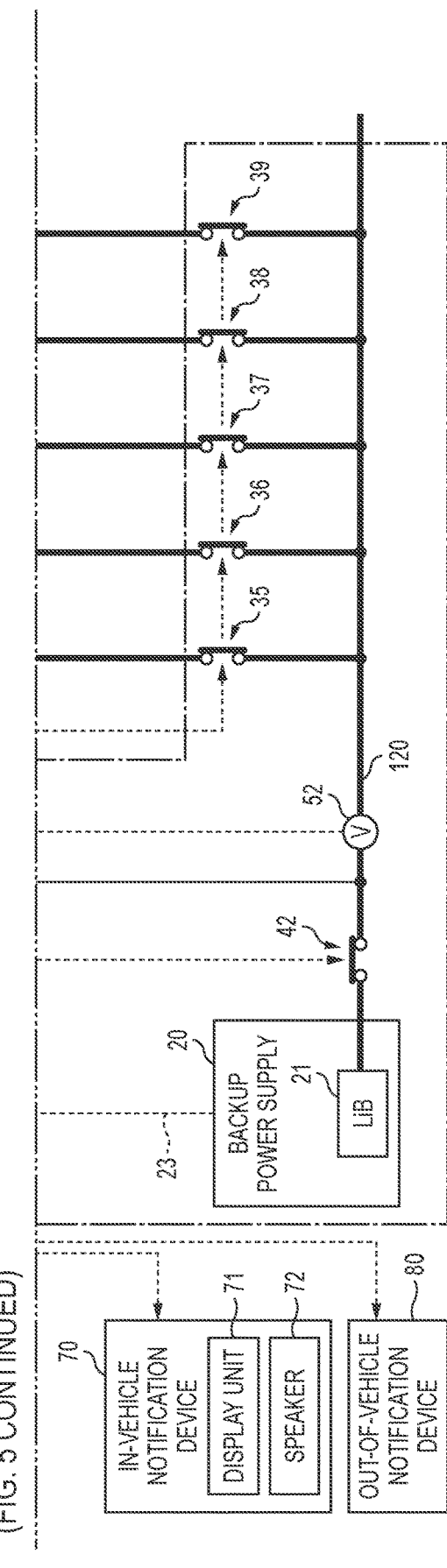

| SOC OF BACKUP POWER SUPPLY | IN-VEHICLE NOTIFICATION INFORMATION | OUT-OF-VEHICLE NOTIFICATION INFORMATION |
|---|---|---|
| SOC > FIRST THRESHOLD A1 | NO | NO |
| SECOND THRESHOLD A2 < SOC ≤ FIRST THRESHOLD A1 | FIRST NOTIFICATION AND SO ON | FOURTH NOTIFICATION AND SO ON |
| SOC ≤ SECOND THRESHOLD A2 | THIRD NOTIFICATION AND SO ON | SECOND NOTIFICATION AND SO ON |

FIG. 8

| IN-VEHICLE NOTIFICATION INFORMATION | NOTIFICATION CONTENT |
|---|---|
| FIRST NOTIFICATION | VEHICLE IS LIKELY TO STOP DUE TO SHORTAGE OF REMAINING CHARGE LEVEL. |
| THIRD NOTIFICATION | VEHICLE STOPS DUE TO SHORTAGE OF REMAINING CHARGE LEVEL. |

(CONT.)

(FIG. 14 CONTINUED)
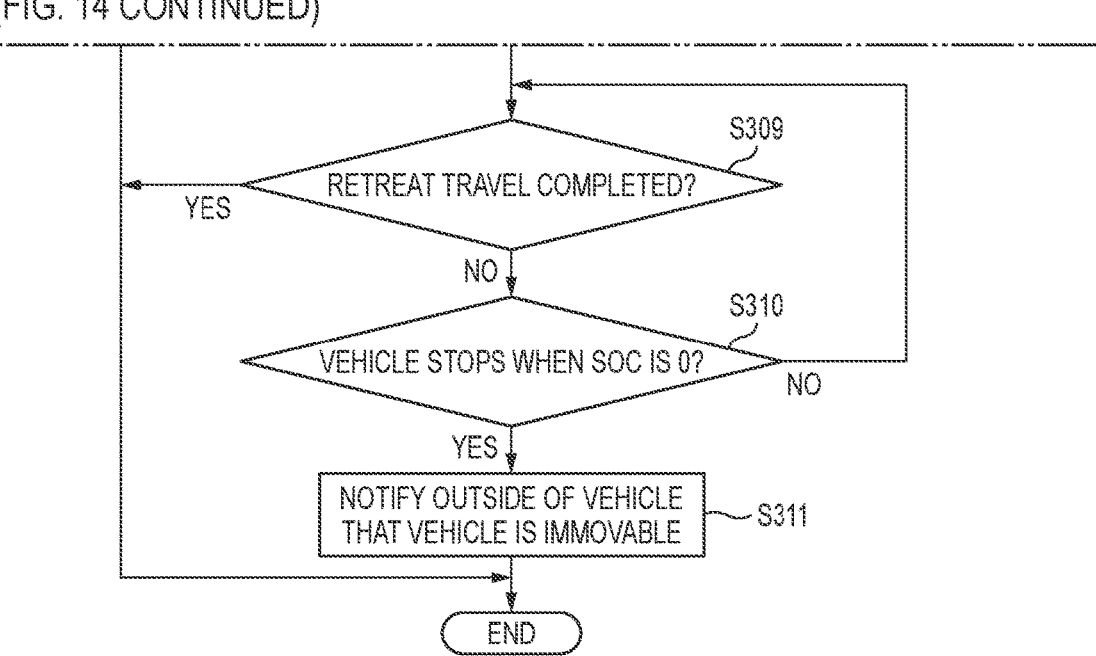

(FIG. 15 CONTINUED)
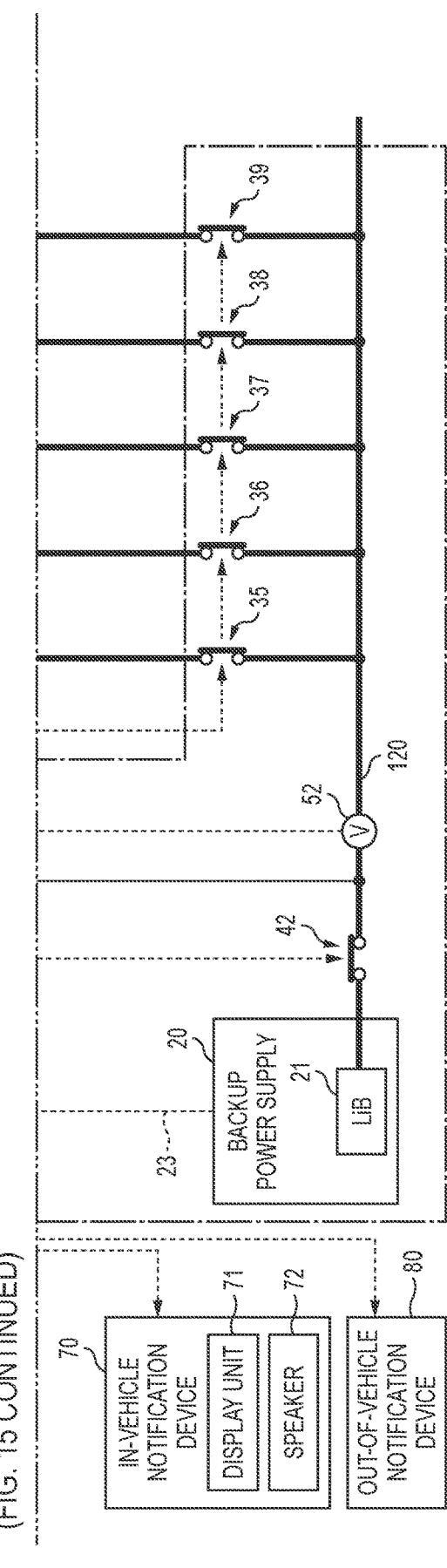

VEHICLE CONTROL SYSTEM AND METHOD OF PERFORMING AUTONOMOUS RETREAT TRAVEL OPERATION

CROSS-REFERENCE RELATED APPLICATIONS

This application is based on and claims priority under 35 USC 119 from Japanese Patent Application No. 2023-056498 filed on Mar. 30, 2023, the contents of which are incorporated herein by reference.

TECHNICAL FIELD

The present disclosure relates to a control device and a control method.

BACKGROUND ART

A vehicle on which a redundant power supply system is mounted is configured to, when a main power supply fails, execute fail-safe control in which electric power from a backup power supply is supplied to a load, and execute retreat travel control using the supplied load (for example, see Japanese Patent Application Laid-open Publication No. 2017-063551 (hereinafter, referred to as Patent Literature 1)). However, for example, it takes time to complete the retreat travel, and when a remaining charge level (SOC (State Of Charge)) of the backup power supply reaches a lower limit (for example, 0) during the retreat travel, the vehicle is unable to travel and stops onsite, and thus there is a concern that a user may feel uneasy.

On the other hand, Japanese Patent Application Laid-open Publication No. 2010-111291 (hereinafter, referred to as Patent Literature 2) proposes a technique in which, when an abnormality occurs in an engine, only the electric motor is set as a driving power source to execute retreat travel, and when the remaining charge level of the battery is equal to or smaller than a lower limit during the retreat travel, a notification is executed to an inside of the vehicle and the retreat travel is stopped.

In addition, Japanese Patent Application Laid-open Publication No. 2022-098967 (hereinafter, referred to as Patent Literature 3) proposes a technique in which, when a failure including a power supply failure occurs in a vehicle, the vehicle is urgently stopped and a notification is executed to an outside of the vehicle.

Accordingly, when the techniques described in Patent Literatures 2 and 3 are applied to the technique described in Patent Literature 1, it is conceivable to notify the inside or the outside of the vehicle when the remaining charge level of the backup power supply reaches the lower limit and the vehicle stops during the retreat travel. Accordingly, it is possible to reduce a sense of uneasiness given to the user.

However, since the notification described above is executed when the remaining charge level of the backup power supply reaches the lower limit and the vehicle stops, the user is unable to hold the vehicle in advance, and a sudden stop of the vehicle may lead to a sense of uneasiness of the user.

The present disclosure has been made in view of the above, and an object thereof is to provide a control device and a control method capable of reducing a sense of uneasiness given to a user when a vehicle stops.

SUMMARY

One aspect of a control device of the present disclosure includes: a controller mounted on a vehicle having an autonomous driving function and configured to execute fail-safe control by a backup power supply when a main power supply fails. The controller is configured to: in the fail-safe control, when a remaining charge level of the backup power supply decreases to or below a first threshold set in advance, execute a first notification to notify in advance an inside of the vehicle that the vehicle is likely to stop due to a shortage of the remaining charge level of the backup power supply; and when the remaining charge level of the backup power supply decreases to or below a second threshold that is smaller than the first threshold, execute a second notification to notify an outside of the vehicle that the vehicle stops.

According to the present disclosure, it is possible to reduce a sense of uneasiness given to a user when a vehicle stops.

BRIEF DESCRIPTION OF DRAWINGS

Exemplary embodiments of the present disclosure will be described in detail based on the following figures, wherein:

FIG. 2 is a diagram illustrating an operation example of the power supply control device according to the first embodiment;

FIG. 3 is a diagram illustrating an operation example of the power supply control device according to the first embodiment;

FIG. 4 is a diagram illustrating an operation example of the power supply control device according to the first embodiment;

FIG. 8 is a diagram illustrating an example of a notification content table according to the first embodiment;

DESCRIPTION OF EMBODIMENTS

Hereinafter, embodiments of a control device and a control method will be described in detail with reference to the accompanying drawings. The present disclosure is not limited to the following embodiments. A control device according to an embodiment is mounted on an electric vehicle having an autonomous driving function, a hybrid vehicle, an engine vehicle that travels by an internal combustion engine, or the like.

1. FIRST EMBODIMENT [1-1. CONFIGURATION OF CONTROL SYSTEM]

Figure 1:
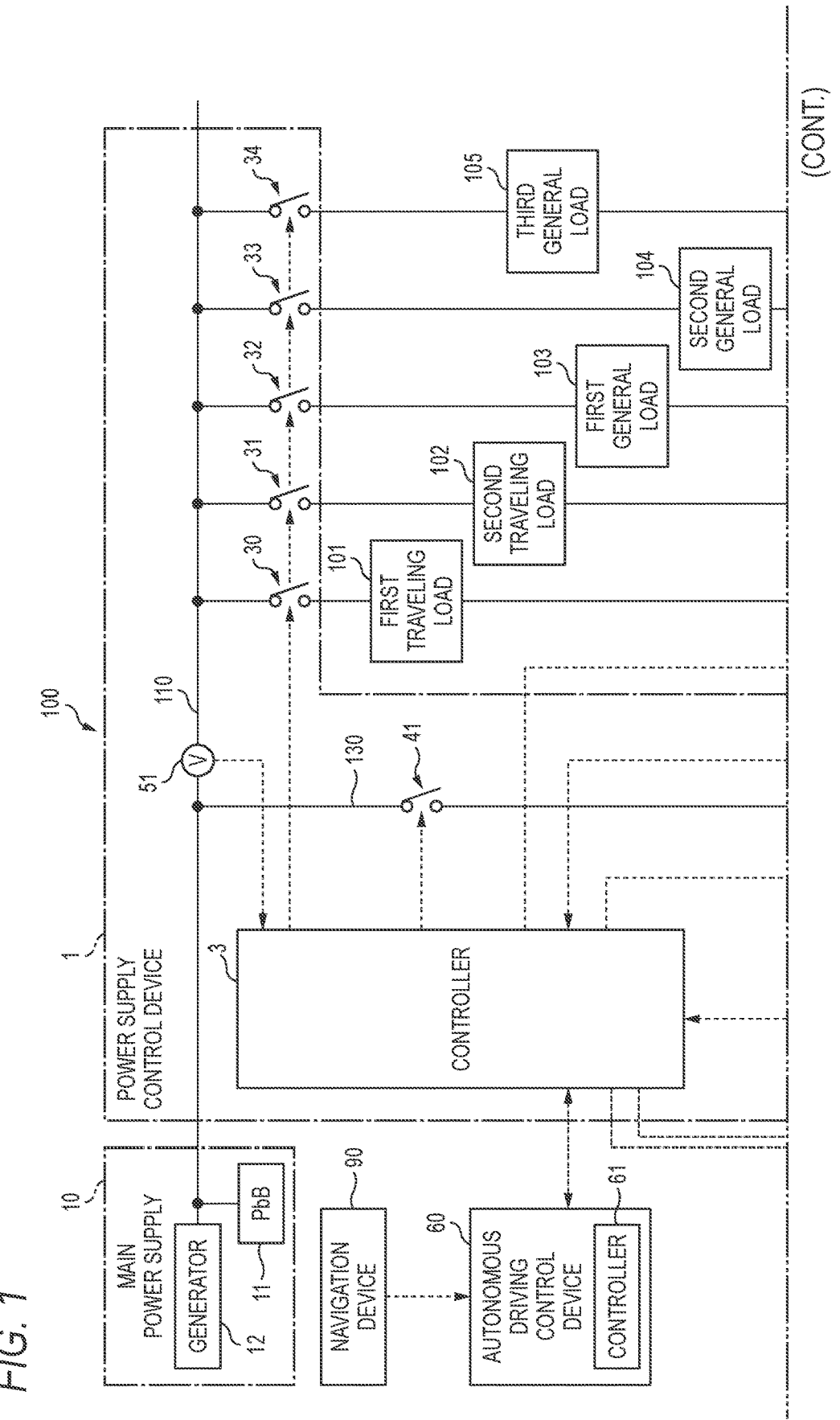
FIG. 1 is a diagram illustrating a configuration example of a control system according to a first embodiment.

FIG. 1 is a diagram illustrating a configuration example of a control system 100 according to a first embodiment. As illustrated in FIG. 1, the control system 100 according to the first embodiment includes a power supply control device 1, a main power supply 10, an autonomous driving control device 60, an in-vehicle notification device 70, an out-of-vehicle notification device 80, and a navigation device 90. The power supply control device 1 is an example of the control device.

When the power supply control device 1 is mounted on an engine vehicle, the main power supply 10 includes a generator 12 and a lead battery (hereinafter referred to as "PbB 11"). The battery of the main power supply 10 may be any secondary battery other than the PbB 11.

The generator 12 is, for example, an alternator that converts kinetic energy of the traveling vehicle into electricity to generate electric power. The generator 12 charges the PbB 11 and a backup power supply 20, which will be described later, with the generated electric power. The main power supply 10 supplies electric power to a plurality of electrical loads mounted on the vehicle.

The main power supply 10 includes a DC/DC converter (not illustrated. Hereinafter, referred to as "DCDC") and the PbB11 when the power supply control device 1 is mounted on an electric vehicle or a hybrid vehicle. In this case, the DCDC is connected to the generator 12 and a high-voltage battery (not illustrated) having a higher voltage than the PbB 11, and steps down voltages of the generator 12 and the high-voltage battery to supply electric power to the plurality of electrical loads. The high-voltage battery is, for example, a vehicle driving battery mounted on an electric vehicle or a hybrid vehicle.

The autonomous driving control device 60 is electrically connected to the power supply control device 1 and the navigation device 90. The autonomous driving control device 60 enables information communication with the power supply control device 1 and the navigation device 90.

The autonomous driving control device 60 includes a global positioning system (GPS) (not illustrated) and a controller 61. The controller 61 includes a microcomputer (hereinafter, described as "microcomputer") including a central processing unit (CPU), a read only memory (ROM), a random access memory (RAM), and the like, and various circuits.

A part or all of the controller 61 may be implemented by hardware such as an application specific integrated circuit (ASIC) or a field programmable gate array (FPGA).

The controller 61 is a device that autonomously drives and controls the vehicle by the CPU executing a program stored in the ROM using the RAM as a work area. The autonomous driving control device 60 may be configured to obtain host vehicle position information of the GPS, map information, road traffic information, weather information, and the like from the navigation device 90. The autonomous driving control device 60 may be configured to obtain at least one of the map information, the road traffic information, and the weather information from an external server (not illustrated).

In the first embodiment, the controller 61 of the autonomous driving control device 60 is an example of a controller mounted on the vehicle having an autonomous driving function and configured to execute retreat travel control by the backup power supply 20 to be described later when the main power supply 10 fails. The controller 61 is an example of a controller that executes retreat travel control by main power supply 10 when the backup power supply 20 fails. A failure in the main power supply 10 includes a failure in a power supply system (a first system line 110 to be described later) of the main power supply 10. A failure of the backup power supply 20 includes a failure in a power supply system (a second system line 120 to be described later) of the backup power supply 20.

The in-vehicle notification device 70 is a device that notifies a driver (the user) of the vehicle of various kinds of information. The in-vehicle notification device 70 includes a display unit 71 and a speaker 72. The display unit 71 includes, for example, a display or a notification lamp. The display unit 71 notifies the driver of various kinds of information by displaying. The speaker 72 notifies the driver of various kinds of information by voice. The sound may include a warning sound (a buzzer). The various kinds of information notified by the in-vehicle notification device 70 include information related to stopping of the vehicle during retreat travel, which will be described later.

The out-of-vehicle notification device 80 is a device that notifies of various kinds of information to an outside of the vehicle such as the surroundings of the vehicle. As the out-of-vehicle notification device 80, a horn, a hazard lamp, a headlamp, a tail lamp, or the like can be used. The various kinds of information notified by the out-of-vehicle notification device 80 include information related to stopping of the vehicle during retreat travel, which is described later. The out-of-vehicle notification device 80 includes an in-vehicle communication module such as a date communication module (DCM), and may be able to communicate with, for example, an emergency notification center (a call center. not illustrated). A notification (a report) to the emergency notification center by the out-of-vehicle notification device 80 will be described later.

The navigation device 90 includes the GPS, a storage unit (not illustrated) that stores the map information and the like, and the like. The navigation device 90 is a device that guides a travel route from a current location to a destination input by the user. The navigation device 90 may obtain the road traffic information and the weather information from the external server (not illustrated), and may provide guidance by reflecting the obtained information on the travel route to the destination.

The power supply control device 1 is a device that controls power supply to the plurality of electrical loads mounted on the vehicle. The power supply control device 1 is electrically connected to the in-vehicle notification device 70 and the out-of-vehicle notification device 80 in addition to the autonomous driving control device 60. The power supply control device 1 can execute information communication with the in-vehicle notification device 70 and the out-of-vehicle notification device 80. The power supply control device 1 is electrically connected to the main power supply 10, a first traveling load 101, a second traveling load 102, a first general load 103, a second general load 104, and a third general load 105.

The first traveling load 101 and the second traveling load 102 are electrical loads related to traveling of the vehicle itself by manual driving and autonomous driving. The first traveling load 101 and the second traveling load 102 include, for example, an electric steering device, a shift-by-wire device, an electric accelerator device, an electric brake device, an in-vehicle camera, various sensors, and a radar.

The first traveling load 101 and the second traveling load 102 assist a steering operation, an accelerator operation, a brake operation, and the like of the driver during the manual driving. During the autonomous driving, the first traveling load 101 and the second traveling load 102 are controlled by the autonomous driving control device 60 to allow the vehicle to drive and travel autonomously.

The first general load 103, the second general load 104, and the third general load 105 are electrical loads that are not related to the traveling itself of the vehicle according to the manual driving and the autonomous driving. The first general load 103, the second general load 104, and the third general load 105 include, for example, an air conditioner, audio, in-vehicle lightings, a drive recorder, a security device, a communication device, and various sensors.

The power supply control device 1 includes the backup power supply 20, a controller 3, the first system line 110, the second system line 120, an inter-system line 130, an inter-system connection unit 41, a battery switch 42, and first to tenth switches 30 to 39.

The backup power supply 20 is a backup power supply when the main power supply 10 cannot supply the electric power. The backup power supply 20 includes a lithium-ion battery (hereinafter, referred to as "LiB 21"). A battery of the backup power supply 20 may be any secondary battery other than the LiB 21.

The first system line 110 is a power supply line that supplies electric power from the main power supply 10 to the plurality of electrical loads. That is, the power supply system of the main power supply 10 includes the main power supply 10 and the first system line 110.

The second system line 120 is a power supply line that supplies electric power from the backup power supply 20 to the plurality of electrical loads. That is, the power supply system of the backup power supply 20 includes the backup power supply 20 and the second system line 120. The inter-system line 130 is a connection line that electrically connects the first system line 110 and the second system line 120.

The inter-system connection unit 41 is a switch capable of connecting and disconnecting the first system line 110 and the second system line 120. The inter-system connection unit 41 may be a DCDC. In this case, the DCDC connects the first system line 110 and the second system line 120 by executing an operation. The DCDC disconnects the connection between the first system line 110 and the second system line 120 by stopping the operation. The battery switch 42 is a switch capable of connecting and disconnecting the backup power supply 20 and the second system line 120.

The first switch 30 is a switch capable of connecting and disconnecting the first system line 110 and the first traveling load 101. The second switch 31 is a switch capable of connecting and disconnecting the first system line 110 and the second traveling load 102. The third switch 32 is a switch capable of connecting and disconnecting the first system line 110 and the first general load 103. The fourth switch 33 is a switch capable of connecting and disconnecting the first system line 110 and the second general load 104. The fifth switch 34 is a switch capable of connecting and disconnecting the first system line 110 and the third general load 105.

The sixth switch 35 is a switch capable of connecting and disconnecting the second system line 120 and the first traveling load 101. The seventh switch 36 is a switch capable of connecting and disconnecting the second system line 120 and the second traveling load 102. The eighth switch 37 is a switch capable of connecting and disconnecting the second system line 120 and the first general load 103. The ninth switch 38 is a switch capable of connecting and disconnecting the second system line 120 and the second general load 104. The tenth switch 39 is a switch capable of connecting and disconnecting the second system line 120 and the third general load 105.

The power supply control device 1 includes a first voltage sensor 51 and a second voltage sensor 52. The first voltage sensor 51 is provided on the first system line 110. The first voltage sensor 51 detects a voltage of the first system line 110 and outputs a detection result to the controller 3. The second voltage sensor 52 is provided on the second system line 120. The second voltage sensor 52 detects a voltage of the second system line 120 and outputs a detection result to the controller 3.

The controller 3 includes a microcomputer including a CPU, a ROM, and a RAM, and various circuits. A part or all of the controller 3 may be implemented by hardware such as an ASIC or an FPGA.

The controller 3 controls operations of the inter-system connection unit 41, the battery switch 42, and the first to tenth switches 30 to 39 by the CPU executing a program stored in the ROM using the RAM as a work area.

Further, the controller 3 obtains information indicating a remaining charge level of the backup power supply 20 obtained from the backup power supply 20 via a state monitoring line 23. The information indicating the remaining charge level of the backup power supply 20 is, for example, a state of charge (SOC) of the LiB 21.

The LiB 21 is in a state where a remaining charge level is maximum when the SOC is 100%. The LiB 21 is in a state where there is no remaining charge level when the SOC is 0%. The controller 3 obtains, for example, the SOC of the LiB 21 as the information indicating the remaining charge level of the backup power supply 20. The controller 3 monitors the remaining charge level of the backup power supply 20 based on the SOC of the LiB 21.

The controller 3 is mounted on the vehicle having an autonomous driving function, and executes fail-safe control (to be described later) for supplying the electric power from the backup power supply 20 to each of the loads 101 to 105 when the main power supply 10 fails. Further, the controller 61 executes fail-safe control (to be described later) for supplying the electric power from the main power supply 10 to each of the loads 101 to 105 when the backup power supply 20 fails.

[1-2. Operation Example of Power Supply Control Device]

Next, an operation of the power supply control device 1 according to the first embodiment will be described with reference to FIGS. 2 to 5. FIGS. 2 to 5 are diagrams illustrating an operation example of the power supply control device 1 according to the first embodiment.

[1-2-1. Normal Operation]

Figure 2:
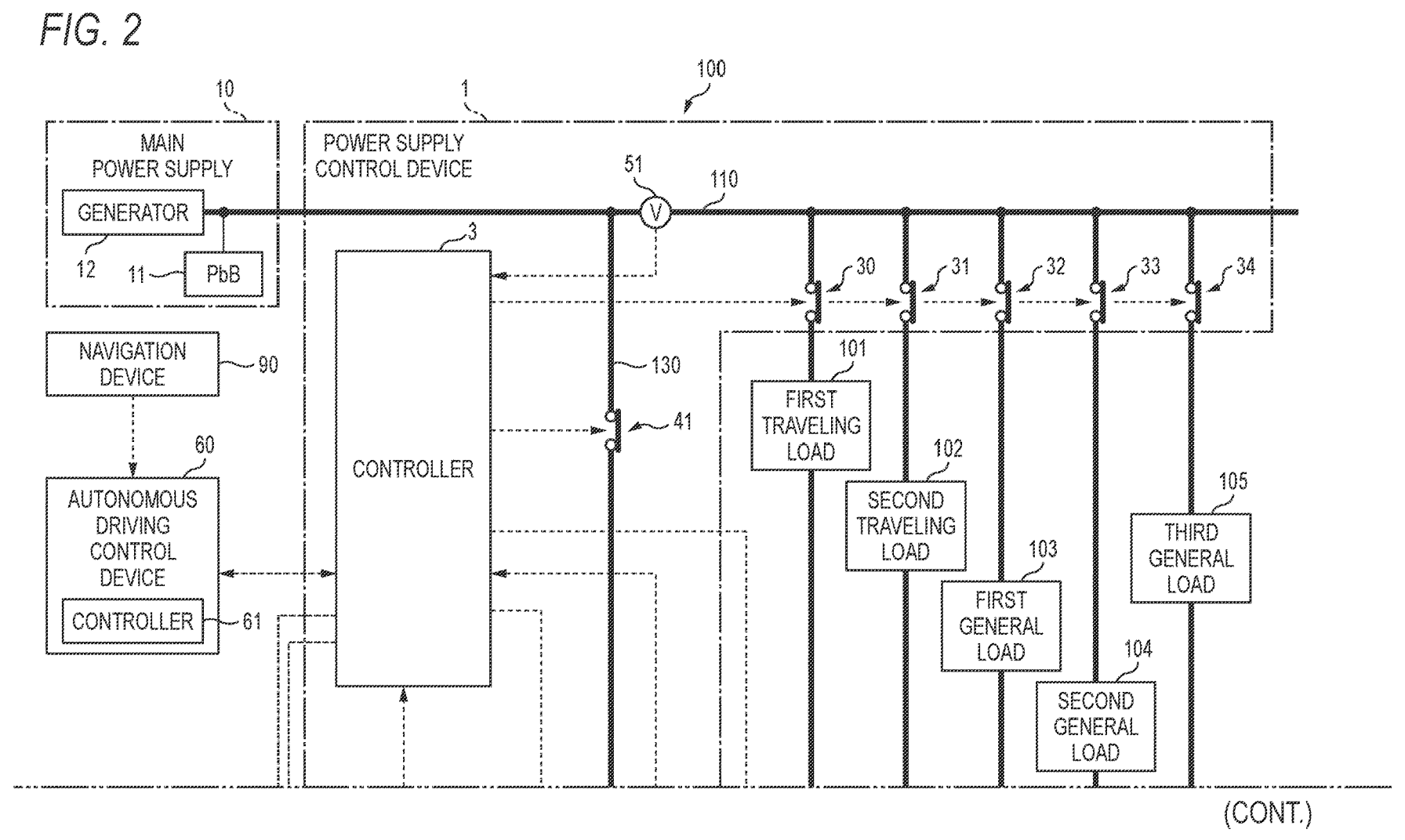

In a state where an ignition switch (IG) of the vehicle is turned on, the controller 3 controls a plurality of connection units as illustrated in FIG. 2 during a stop, the manual driving, or the autonomous driving in a normal state in which the power supply systems of the main power supply 10 and the backup power supply 20 are not failed.

Specifically, the controller 3 turns on the inter-system connection unit 41. The controller 3 turns off the battery switch 42. The controller 3 turns on the first to tenth switches 30 to 39. Accordingly, the power supply control device 1 can supply electric power from the main power supply 10 to the first traveling load 101, the second traveling load 102, first general load 103, the second general load 104, and the third general load 105 while preventing the discharge in a normal state of the LiB 21.

[1-2-2. Operation at Time of Failure of Power Supply System of Power Supply Control Device]

In the control system 100, the power supply system may fail. Examples of the failure of the power supply system include a ground fault of the first system line 110 including the main power supply 10 and a ground fault of the second system line 120 including the backup power supply 20.

In the power supply control device 1, when the ground fault of the first system line 110, the ground fault of the second system line 120, or the like occurs during a normal operation, the voltages of the first system line 110 and the second system line 120 become smaller than a normal voltage.

Figure 3:
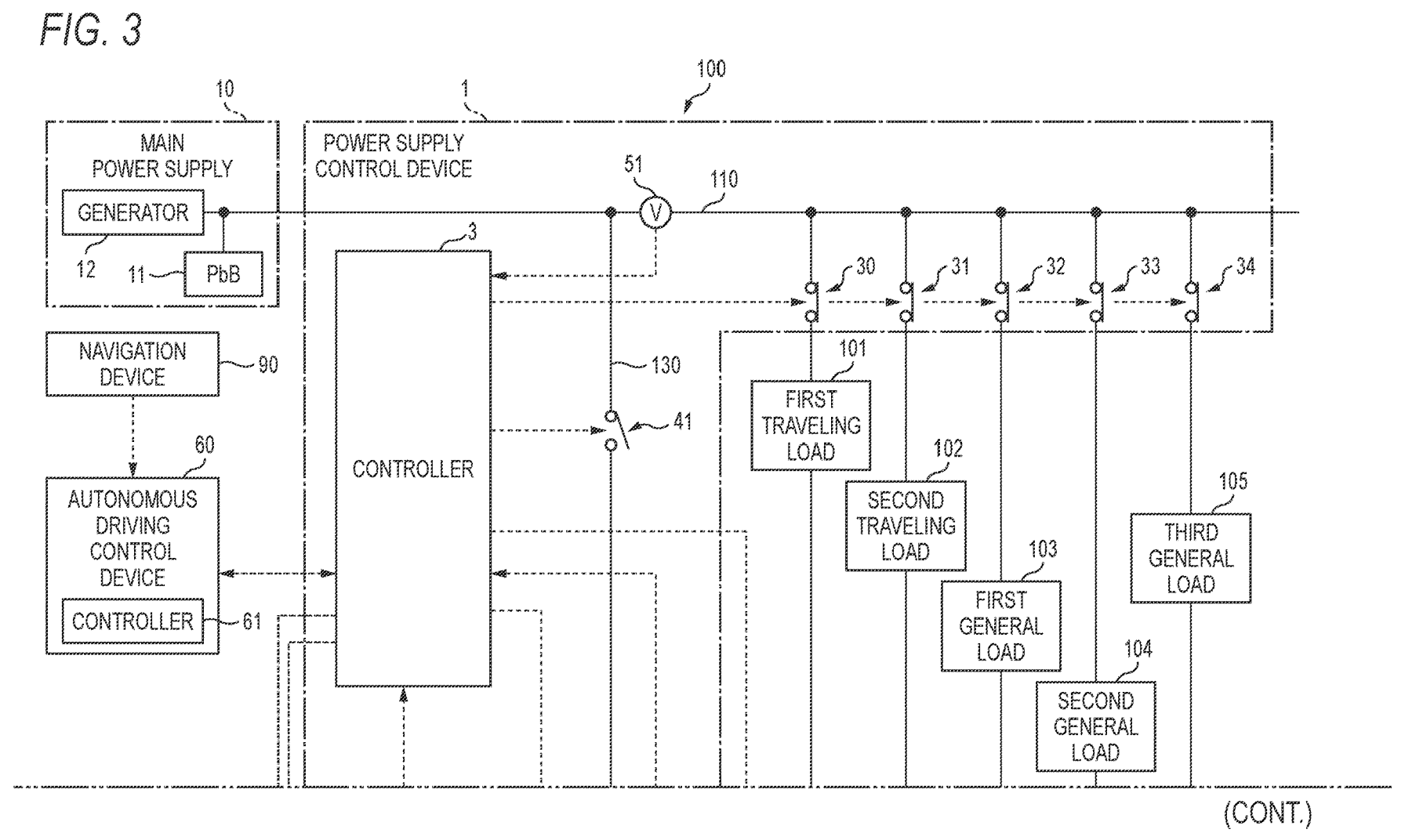

Therefore, when the voltage of the second system line 120 detected by the second voltage sensor 52 (hereinafter, referred to as a "second system voltage V2") is equal to or smaller than a ground fault threshold, the controller 3 temporarily determines that a failure occurs in the power supply system. As illustrated in FIG. 3, the controller 3 turns off the inter-system connection unit 41 and turns on the battery switch 42. For example, when the voltage of the first system line 110 detected by the first voltage sensor 51 (hereinafter, referred to as a "first system voltage V1") is equal to or smaller than the ground fault threshold, the controller 3 may temporarily determine that a failure occurs in the power supply system.

Accordingly, the connection between the first system line 110 and the second system line 120 is disconnected. When no ground fault occurs in the first system line 110, the power supply control device 1 can supply electric power from the main power supply 10. When no ground fault occurs in the second system line 120, the power supply control device 1 can supply electric power from the backup power supply 20.

The temporary determination may be executed by a hard circuit having a comparator. In this case, the comparator compares the second system voltage V2 with the ground fault threshold. When the detected voltage is equal to or smaller than the ground fault threshold, the comparator turns off the inter-system connection unit 41 and turns on the battery switch 42 by outputting a failure detection signal indicating the temporary determination.

When the second system voltage V2 is equal to or smaller than the ground fault threshold even if a predetermined time has elapsed after the temporary determination and the first system voltage V1 returns to the voltage larger than the ground fault threshold within a predetermined time period, the controller 3 executes main-determination that a ground fault occurs in the second system line 120.

Figure 4:
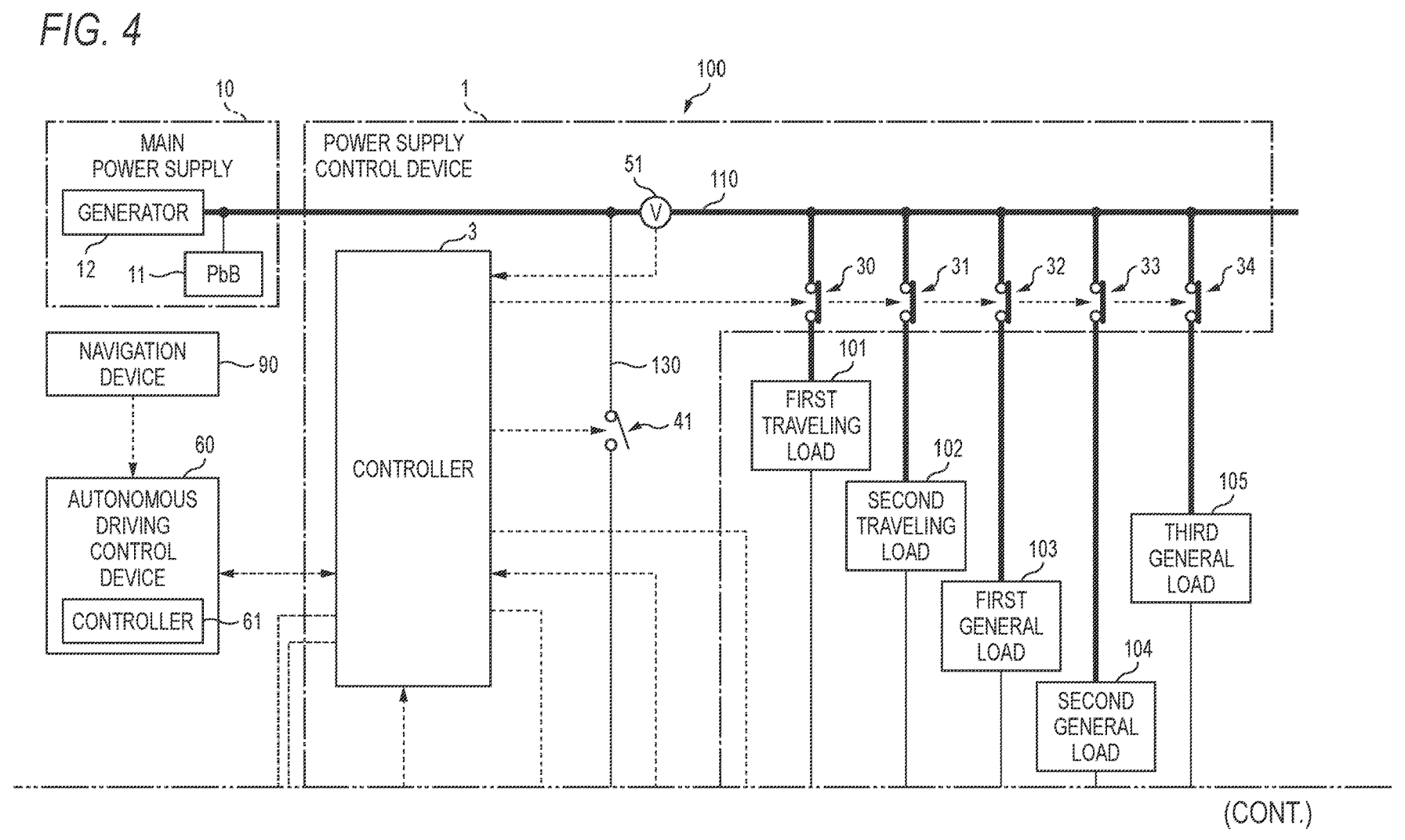

In this case, the controller 3 executes fail-safe control for supplying electric power from the main power supply 10 to the loads 101 to 105. Specifically, as illustrated in FIG. 4, the controller 3 turns off the battery switch 42 while continuing to turn off the inter-system connection unit 41. Further, the controller 3 turns off sixth to tenth switches 35 to 39. The controller 3 supplies electric power from the main power supply 10 to each of the loads 101 to 105 via the first system line 110.

In response to the main-determination that the backup power supply 20 fails, such as a ground fault occurs in the second system line 120, the controller 3 notifies the autonomous driving control device 60 that the backup power supply 20 fails and that fail-safe control by the main power supply 10 is started.

When the controller 61 of the autonomous driving control device 60 is notified of the start of the fail-safe control by the main power supply 10 from the power supply control device 1, the controller 61 starts the retreat travel control (FOP (Fail Operation)) by the autonomous driving. The retreat travel is to cause the vehicle to travel to a safe place and stop.

When the retreat travel by the autonomous driving is started, the controller 61 of the autonomous driving control device 60 controls the in-vehicle notification device 70 to request the driver to start the retreat travel by the manual driving. When the controller 61 detects a driving operation manually executed by the driver, the controller 61 ends the autonomous driving control.

In the power supply control device 1, after the temporary determination that a failure occurs in the power supply system, the first system voltage V1 may be equal to or smaller than the ground fault threshold for a predetermined time period or more, and the second system voltage V2 may return to the voltage larger than the ground fault threshold within the predetermined time period.

Figure 5:
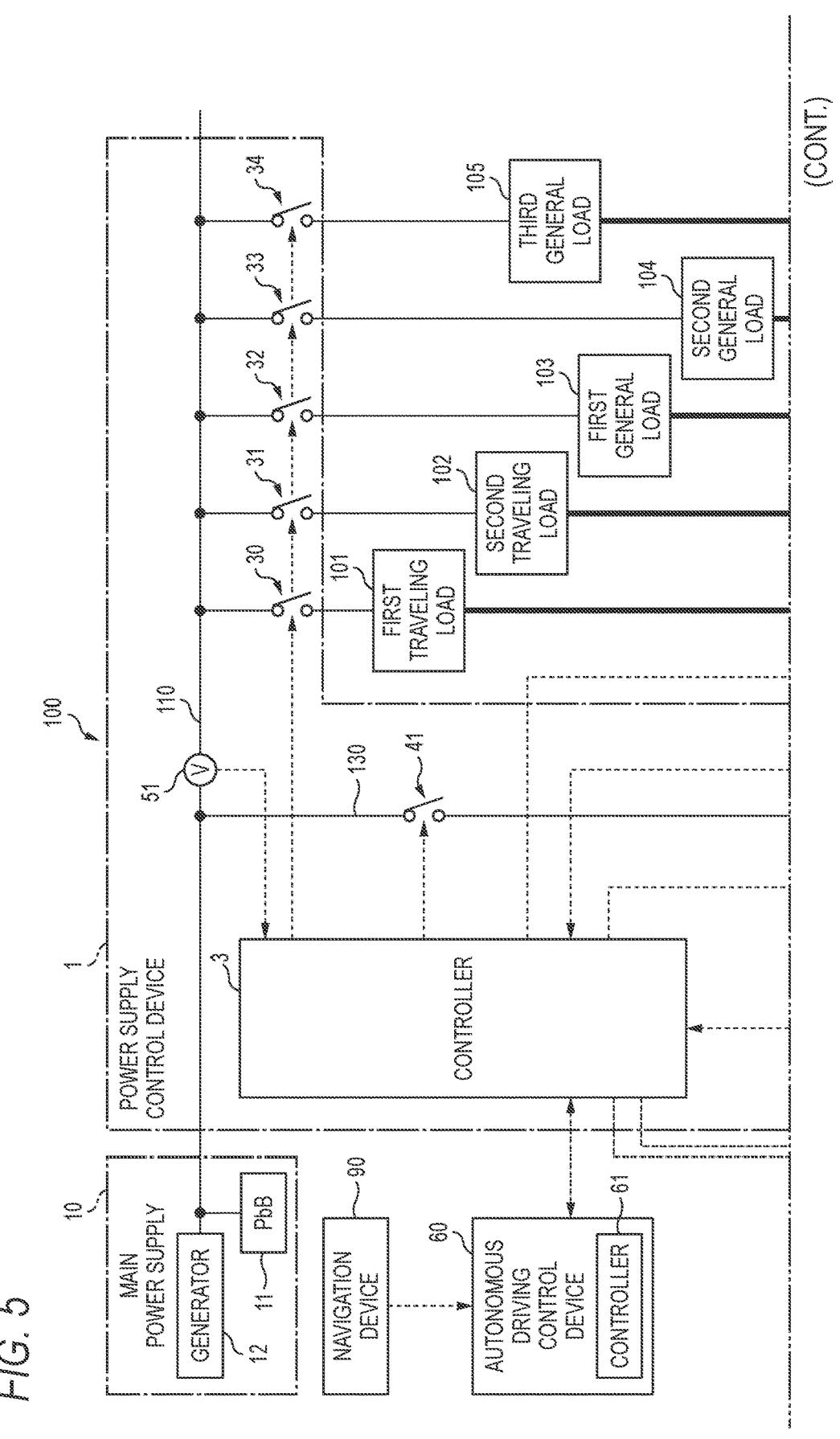
FIG. 5 is a diagram illustrating an operation example of the power supply control device according to the first embodiment.

In this case, the controller 3 of the power supply control device 1 executes main-determination that a ground fault occurs in the first system line 110 including the main power supply 10. When the main power supply 10 fails in this manner, the controller 3 executes the fail-safe control for supplying the electric power from the backup power supply 20 to the loads. Specifically, as illustrated in FIG. 5, the controller 3 continues to turn off the inter-system connection unit 41 and turn on the battery switch 42, turns off the first to fifth switches 30 to 34, and supplies the electric power from the backup power supply 20 to each of the loads 101 to 105 via the second system line 120.

In response to the main-determination that the main power supply 10 fails due to a ground fault of the first system line 110 or the like, the controller 3 notifies the autonomous driving control device 60 that the main power supply 10 fails and that fail-safe control by the backup power supply 20 is started.

When the controller 61 of the autonomous driving control device 60 is notified of the start of the fail-safe control by the backup power supply 20 from the power supply control device 1, the controller 61 starts the retreat travel control (FOP) by the autonomous driving.

After the temporary determination, when the first system voltage V1 and the second system voltage V2 return to the voltage larger than the ground fault threshold within the predetermined time period, the controller 3 determines that a result of the temporary determination is an error. That is, the controller 3 executes main-determination that the power supply system has not failed. The controller 3 turns off the battery switch 42 and turns on the inter-system connection unit 41. Accordingly, the power supply control device 1 returns to a normal operation illustrated in FIG. 2.

In the fail-safe control by the backup power supply 20, as described above, the electric power from the backup power supply 20 is supplied to the loads (the first and second traveling loads 101 and 102 and the first to third general loads 103 to 105) (see FIG. 5). The retreat travel control using the supplied loads is executed.

When the main power supply 10 fails and the retreat travel control is executed by the backup power supply 20, the backup power supply 20 is set to a charging state capable of completing the retreat travel. For example, the backup power supply 20 is set to a charging state in which an assumed time period (for example, 20 seconds) in which the retreat travel can be completed can be secured when the retreat travel control is executed by the backup power supply 20.

However, depending on a surrounding situation of the vehicle at the time of retreat travel, for example, a distance from a current location of the vehicle to a safe retreat place is relatively long, the actual traveling time period until the completion of the retreat travel may be longer than the assumed time period. When the traveling time period until the completion of the retreat travel becomes longer than the assumed time period, the remaining charge level of the backup power supply 20 decreases more than expected and decreases to a lower limit which is a value for forcibly ending the retreat travel.

When the remaining charge level of the backup power supply 20 decreases to the lower limit, the retreat travel ends and the vehicle stops. When the vehicle stops, even if the user or the like of the vehicle is notified of the stop of the vehicle, the user is unable to hold the vehicle in advance, and a sudden stop of the vehicle may lead to a sense of uneasiness of the user.

Therefore, the controller 3 of the power supply control device 1 according to the present embodiment may reduce the sense of uneasiness given to the user when the vehicle stops. Specifically, the controller 3 notifies in advance an inside of the vehicle that the vehicle is likely to stop at a time point before the vehicle stops and at a time point when the vehicle is likely to stop due to a shortage of the remaining charge level of the backup power supply 20. When the vehicle stops, the controller 3 notifies the outside of the vehicle that the vehicle stops.

Figures 6, 7:
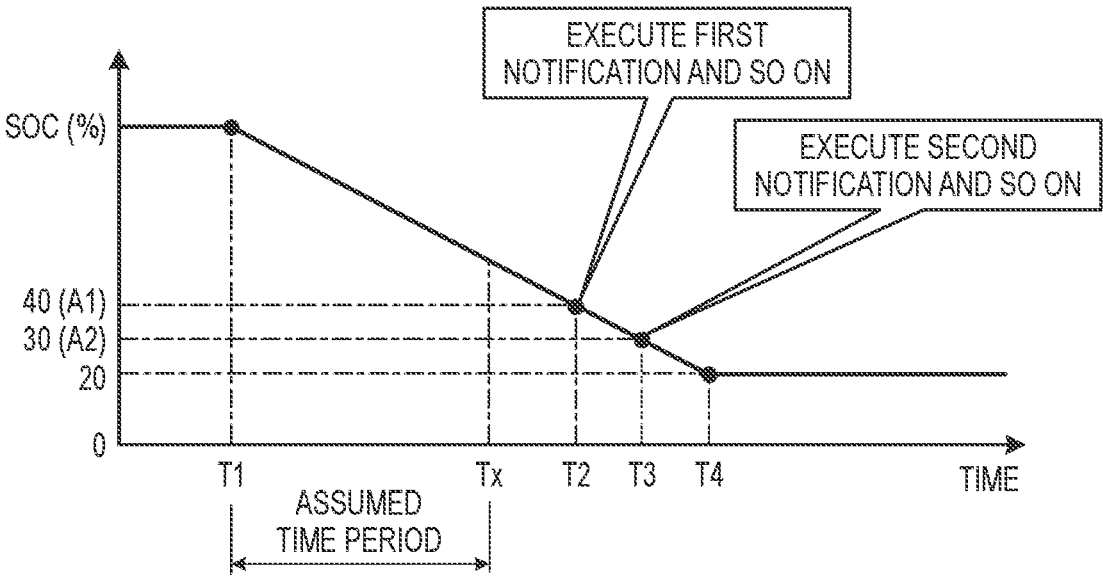
FIG. 6 is a diagram illustrating a state of a remaining charge level of a backup power supply during fail-safe control.
FIG. 7 is a diagram illustrating an example of a notification information table according to the first embodiment.

Here, the process executed by the controller 3 will be described in detail with reference to FIG. 6. FIG. 6 is a diagram illustrating a state of the remaining charge level (SOC) of the backup power supply 20 during the fail-safe control.

In the example of FIG. 6, when the vehicle does not reach a safe place during the retreat travel, a lower limit of the SOC for forcibly ending the retreat travel is set in advance to a value (for example, 20%) larger than 0. The lower limit (20%) is a value at which the backup power supply 20 is over-discharged when the SOC is equal to or smaller than the value thereof and causes a problem in reuse of the backup power supply 20, in other words, a value that leads to battery deterioration.

As illustrated in FIG. 6, when the main power supply 10 fails at a time T1, the controller 3 starts the fail-safe control. When the fail-safe control is started, the electric power from the backup power supply 20 is supplied to each of the loads 101 to 105, and thus the SOC of the backup power supply 20 gradually decreases.

When the SOC of the backup power supply 20 decreases to or below a first threshold A1 set in advance (see a time T2), the controller 3 performs a first notification to notify in advance the inside of the vehicle that the vehicle is likely to stop due to the shortage of the SOC of the backup power supply 20.

The first threshold A1 is set in advance to a value (for example, 40%) larger than 0. Specifically, the first threshold A1 is set to a value larger than the above-described lower limit, in other words, set to a value larger than the lower limit at which the retreat travel is forcibly ended and the vehicle is in a stopped state. In the above description, although the first threshold A1 is indicated by a specific numerical value, this is merely an example and is not limited thereto, and can be set to any value.

In the first notification, the controller 3 controls the in-vehicle notification device 70 to notify the user in the vehicle that the vehicle is likely to stop due to the shortage of the SOC of the backup power supply 20. Specifically, the controller 3 notifies the user in the vehicle by displaying, on the display unit 71 of the in-vehicle notification device 70, a message having a content indicating that the vehicle is likely to stop due to the shortage of the SOC. Instead of or in addition to the display on the display unit 71, the controller 3 may output, by the speaker 72, a sound having a content indicating that the vehicle is likely to stop due to the shortage of the SOC and notify the user in the vehicle.

Accordingly, by the controller 3, the user may recognize in advance that the vehicle is likely to stop, and the sense of uneasiness given to the user when the vehicle stops may be reduced.

Subsequently, when the SOC of the backup power supply 20 further decreases to or below a second threshold A2 that is smaller than the first threshold A1 (see a time T3), the controller 3 performs a second notification to notify the outside of the vehicle that the vehicle stops.

The second threshold A2 is set in advance to a value (for example, 30%) larger than 0. Specifically, the second threshold A2 is set to a value smaller than the first threshold A1 (40%) and larger than the lower limit (20%). In other words, the second threshold A2 is set to a value indicating the SOC after the first notification is executed and before the retreat travel is forcibly ended and the vehicle is in a stopped state. In the above description, although the second threshold A2 is indicated by a specific numerical value, this is merely an example and is not limited thereto, and can be set to any value.

In the second notification, the controller 3 controls the out-of-vehicle notification device 80 to notify the outside of the vehicle that the vehicle stops due to the shortage of the SOC of the backup power supply 20. Specifically, the controller 3 notifies the outside of the vehicle that the vehicle stops due to the shortage of the SOC of the backup power supply 20 by, for example, sounding a horn of the out-of-vehicle notification device 80 or lighting (blinking) at least one of a hazard lamp, a headlamp, and a tail lamp.

Accordingly, by the controller 3, a person outside the vehicle (for example, a driver of another vehicle traveling around the vehicle, a person around the vehicle, or the like) may recognize that the vehicle stops. Therefore, the person outside the vehicle may pay attention to the stopped vehicle, and thus the sense of uneasiness given to the user of the vehicle due to the stop of the vehicle may be reduced.

In the second notification, the controller 3 may notify an external center (here, an emergency notification center) that the vehicle stops. Specifically, the controller 3 transmits stop information indicating that the vehicle stops due to shortage of the SOC of the backup power supply 20 to the emergency notification center through the in-vehicle communication module of the out-of-vehicle notification device 80. In the emergency notification center, when the stop information transmitted from the out-of-vehicle notification device 80 is received, for example, an operator makes contact with a related institution such as the police, the automatic vehicle maintenance company, or the insurance company in accordance with the stop information, and requests the related institution to deal with the stop information. The stop information includes, but is not limited to, user information of the vehicle, position information at which the vehicle stops, and the like.

As described above, by notifying the external center (the emergency notification center) instead of the user of the vehicle who is likely to be confused by the stop of the vehicle, the controller 3 may take an appropriate countermeasure to the stop of the vehicle, and the sense of uneasiness of the user may be reduced.

Referring to FIG. 6, when the SOC of the backup power supply 20 decreases to the lower limit (20%) (see a time T4), the controller 3 ends the fail-safe control. That is, the controller 3 stops the power supply from the backup power supply 20 to each of the loads 101 to 105 by turning off the battery switch 42. When ending the fail-safe control, the controller 3 outputs a retreat travel end instruction to the controller 61 of the autonomous driving control device 60 to end the retreat travel. Upon receiving the retreat travel end instruction, the controller 61 of the autonomous driving control device 60 ends the retreat travel control. When the fail-safe control and the retreat travel control end, the vehicle stops.

In the above description, the controller 3 executes the second notification to notify the outside of the vehicle when the SOC of the backup power supply 20 decreases to or below the second threshold A2 (see the time T3). and may execute a third notification to notify the inside of the vehicle that the vehicle stops.

In the third notification, the controller 3 controls the in-vehicle notification device 70 to notify the user in the vehicle that the vehicle stops due to the shortage of the SOC of the backup power supply 20. Specifically, the controller 3 notifies the user in the vehicle by displaying, on the display unit 71 of the in-vehicle notification device 70, a message having a content indicating that the vehicle stops due to the shortage of the SOC. Instead of or in addition to the display on the display unit 71, the controller 3 may output, by the speaker 72, a sound having a content indicating that the vehicle stops due to the shortage of the SOC and notify the user in the vehicle.

Accordingly, by the controller 3, the user may recognize that the vehicle stops, and the sense of uneasiness given to the user when the vehicle stops may be reduced.

In the third notification, the controller 3 may notify the user in the vehicle of a countermeasure taken when the vehicle stops. Specifically, the controller 3 displays, on the display unit 71 of the in-vehicle notification device 70, a message having a content indicating a countermeasure taken when the vehicle stops, such as "please evacuate to a safe place on a road shoulder and contact the police". Instead of or in addition to the display on the display unit 71, the controller 3 may output, by the speaker 72, a sound having a content indicating the countermeasure taken when the vehicle stops. Accordingly, the user can take an appropriate countermeasure when the vehicle stops.

In the above description, the controller 3 executes the first notification to notify in advance the inside of the vehicle when the SOC of the backup power supply 20 decreases to or below the first threshold A1 (see the time T2), and may further execute a fourth notification to notify the outside of the vehicle that the vehicle is likely to stop.

In the fourth notification, the controller 3 controls the out-of-vehicle notification device 80 to notify the outside of the vehicle that the vehicle is likely to stop due to the shortage of the SOC of the backup power supply 20. Specifically, the controller 3 notifies the outside of the vehicle that the vehicle is likely to stop due to the shortage of the SOC of the backup power supply 20 by, for example, lighting (blinking) a hazard lamp of the out-of-vehicle notification device 80.

In the second notification and the fourth notification, it is preferable that operation contents of the out-of-vehicle notification device 80 be different from each other. For example, the operation content of the out-of-vehicle notification device 80 in the second notification to notify that the vehicle stops is set to an operation content for calling attention to the person outside the vehicle, as compared with the operation content of the out-of-vehicle notification device 80 in the fourth notification to notify that the vehicle is likely to stop. For example, when the notification is executed to the outside of the vehicle by blinking the hazard lamp, a blinking cycle of the second notification is made shorter than a blinking cycle of the fourth notification.

As described above, by executing the fourth notification, the controller 3 may cause the person outside the vehicle to recognize that the vehicle is likely to stop. Therefore, the person outside the vehicle may pay attention to the vehicle that is likely to stop, and thus a sense of uneasiness given to the user of the vehicle due to the possibility of the stop of the vehicle may be reduced.

As illustrated in FIG. 6, the assumed time period (times T1 to Tx) is set to be shorter than a time period (times T1 to T4) from the start of the fail-safe control to the decrease of the SOC of the backup power supply 20 to the lower limit (20%). In other words, the time period (the times T1 to T4) from the start of the fail-safe control to the decrease of the SOC of the backup power supply 20 to the lower limit is set to be equal to or longer than the assumed time period (the times T1 to Tx) estimated in advance when the retreat travel is completed. Accordingly, for example, if the surrounding situation of the vehicle is not such that the distance from the current location of the vehicle to the safe retreat place is relatively long, the fail-safe control and the retreat travel control may be ended before the SOC of the backup power supply 20 decreases to the lower limit.

Further, the above-described assumed time period (the times T1 to Tx) is set to be shorter than a time period (times T1 to T2) from the start of the fail-safe control to the decrease of the SOC of the backup power supply 20 to the first threshold A1 (40%). In other words, the time period (the times T1 to T2) from the start of the fail-safe control to the decrease of the SOC of the backup power supply 20 to the first threshold A1 is set to be equal to or longer than the assumed time period (the times T1 to Tx) estimated in advance when the retreat travel is completed. Accordingly, the first notification, the fourth notification, and the like are not executed before the assumed time period elapses from the start of the fail-safe control, and thus it is possible to prevent the unnecessary notification from being executed.

[1-3. Notification Information Table]

The controller 3 of the power supply control device 1 stores a notification information table in order to execute the above-described various notifications. Here, a notification information table according to the first embodiment will be described with reference to FIG. 7. FIG. 7 is a diagram illustrating an example of the notification information table according to the first embodiment.

As illustrated in FIG. 7, the notification information table includes items such as "a SOC of a backup power supply", "in-vehicle notification information", and "out-of-vehicle notification information", and data in each item is associated with each other.

When the main power supply 10 fails and the fail-safe control by the backup power supply 20 is executed, the controller 3 of the power supply control device 1 refers to the notification information table. The controller 3 executes a notification process according to a state of the SOC of the backup power supply 20.

For example, when the SOC of the backup power supply 20 is larger than the first threshold A1 (40%) during the retreat travel by the autonomous driving in which the fail-safe control is executed, the controller 3 does not execute the notification to the inside of the vehicle or the notification to the outside of the vehicle. That is, since the SOC of the backup power supply 20 still remains sufficiently and there is a high possibility that the vehicle may travel to a safe place and stop during the retreat travel, the controller 3 does not execute the notification to the inside of the vehicle or the outside of the vehicle.

When the SOC of the backup power supply 20 is larger than the second threshold A2 (30%) and equal to or smaller than the first threshold A1 (40%), the controller 3 executes the first notification or the like to the inside of the vehicle and executes the fourth notification or the like to the outside of the vehicle. Here, an example in which the controller 3 executes both the first notification and the fourth notification has been described, but the present disclosure is not limited thereto, and one of the first notification and the fourth notification (for example, only the first notification) may be executed. The specific notification content of the first notification will be described later with reference to FIG. 8.

When the SOC of the backup power supply 20 is equal to or smaller than the second threshold A2 (30%), the controller 3 executes the third notification or the like to the inside of the vehicle and executes the second notification or the like to the outside of the vehicle. Here, an example in which the controller 3 executes both the second notification and the third notification has been described, but the present disclosure is not limited thereto, and one of the second notification and the third notification (for example, only the second notification) may be executed. The specific notification content of the third notification will be described later with reference to FIG. 8.

[1-4. Notification Content Table]

The controller 3 of the power supply control device 1 stores a notification content table in order to execute the above-described notification to the inside of the vehicle. Here, the notification content table according to the first embodiment will be described with reference to FIG. 8. FIG. 8 is a diagram illustrating an example of the notification content table according to the first embodiment.

As illustrated in FIG. 8, the notification content table includes items such as "in-vehicle notification information" and "notification content", and data in the items are associated with each other.

The controller 3 of the power supply control device 1 refers to the notification content table when executing the notification to the inside of the vehicle. The controller 3 executes a notification process to the inside of the vehicle with notification contents corresponding to the state of the SOC of the backup power supply 20 and the stopped state of the vehicle.

When the first notification is executed, that is, when the SOC of the backup power supply 20 is larger than the second threshold A2 and equal to or smaller than the first threshold A1, the controller 3 notifies the inside of the vehicle of a message having a content indicating that the vehicle is likely to stop due to the shortage of the SOC of the backup power supply 20. For example, the controller 3 notifies the user in the vehicle of contents such as "It is likely to stop the vehicle due to the shortage of the remaining charge level.". Since the notification is executed at the time point before the vehicle stops, the first notification is an advance notification indicating that the vehicle is likely to stop.

When the third notification is executed, that is, when the SOC of the backup power supply 20 is equal to or smaller than the second threshold A2, the controller 3 notifies the inside of the vehicle of a message having a content indicating that the vehicle stops due to the shortage of the SOC of the backup power supply 20. For example, the controller 3 notifies the user in the vehicle of contents such as "The vehicle is stopped due to the shortage of the remaining charge level.". Since the notification is executed at a time point when the vehicle stops soon, the third notification is a confirmation notification indicating that the vehicle stops.

As described above, the first notification and the third notification have different notification contents. Specifically, the first notification is an advance notification indicating that the vehicle is likely to stop, and the third notification is a confirmation notification indicating that the vehicle stops.

Accordingly, the controller 3 may notify the inside of the vehicle of a notification content corresponding to the state of the SOC of the backup power supply 20 and the stopped state of the vehicle. Specifically, the controller 3 may cause the user to recognize that the vehicle is likely to stop, that the vehicle stops, and the like according to the state of the SOC of the backup power supply 20 and the like, and may reduce the sense of uneasiness given to the user when the vehicle stops.

[1-5. Process Executed by Controller of Power Supply Control Device]

Figure 9:
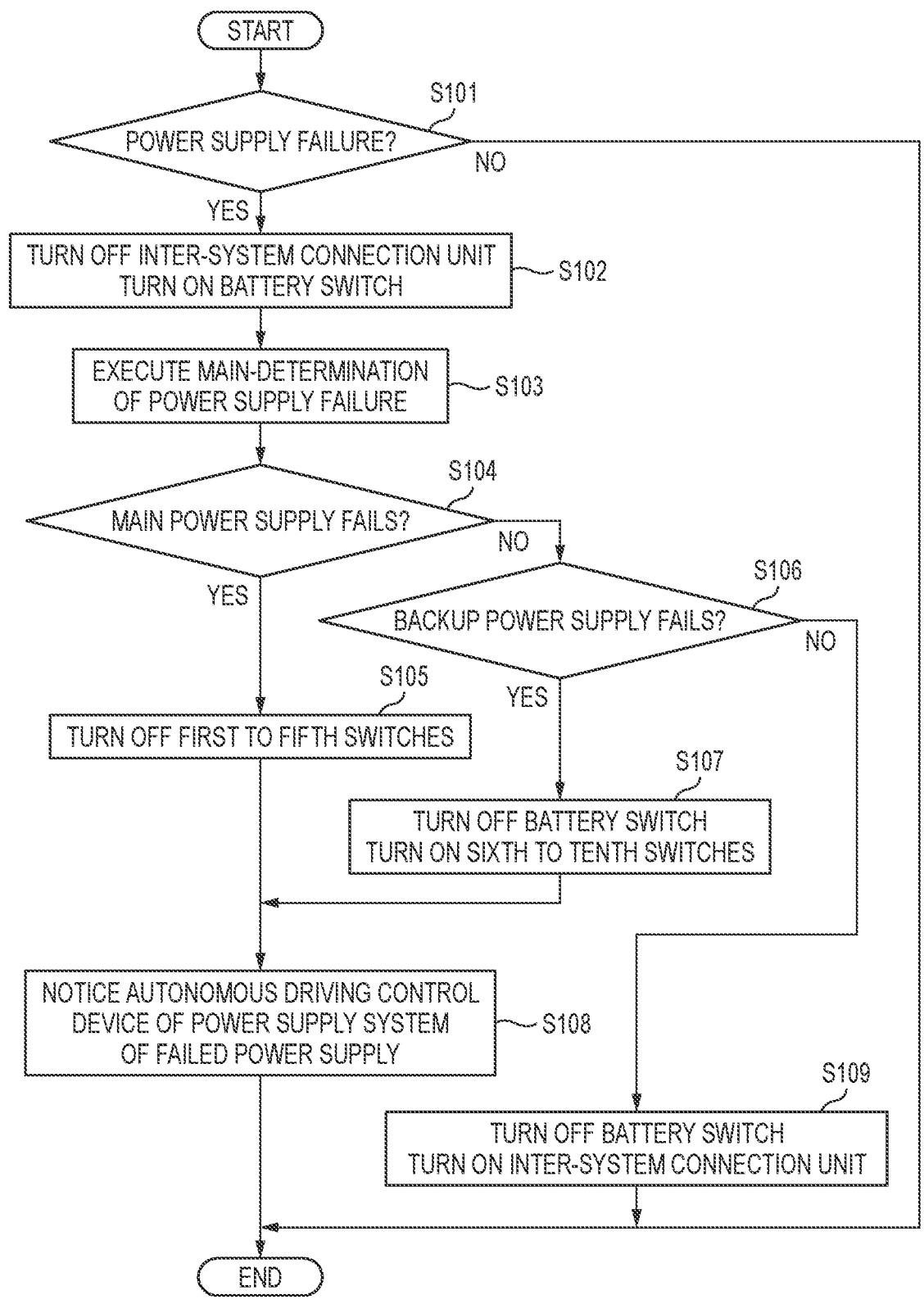
FIG. 9 is a flowchart illustrating an example of a process executed by a controller of the power supply control device according to the first embodiment.
Figure 10:
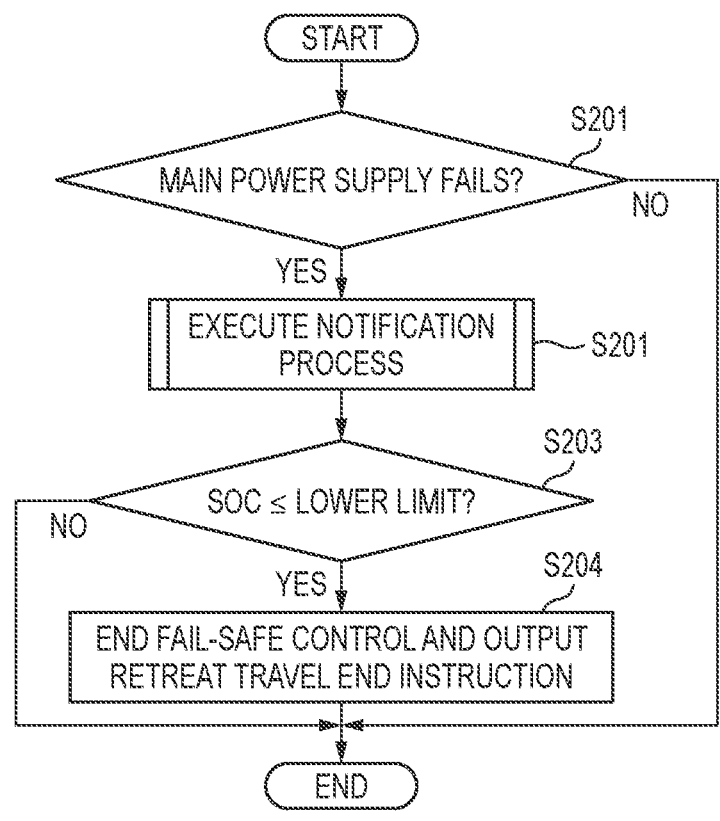
FIG. 10 is a flowchart illustrating an example of a process executed by the controller of the power supply control device according to the first embodiment.
Figure 11:
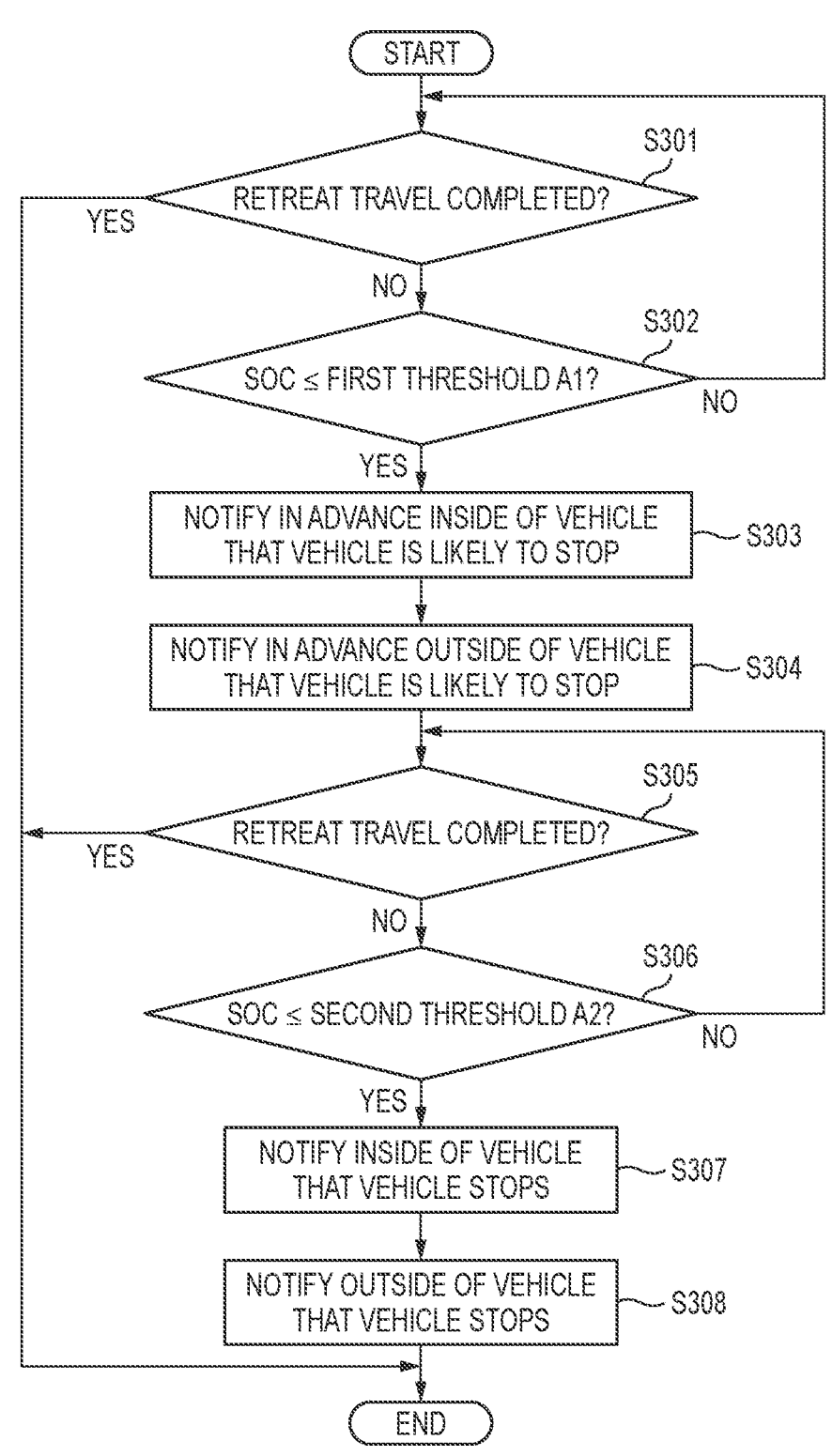
FIG. 11 is a flowchart illustrating an example of a process executed by the controller of the power supply control device according to the first embodiment.

Next, a process executed by the controller 3 of the power supply control device 1 according to the first embodiment will be described with reference to FIGS. 9 to 11. FIGS. 9 to 11 are flowcharts illustrating examples of processes executed by the controller 3 of the power supply control device 1 according to the first embodiment.

When the vehicle is started, the controller 3 turns on the inter-system connection unit 41 and turns off the battery switch 42, and then executes the process illustrated in FIG. 9. As illustrated in FIG. 9, the controller 3 temporarily determines whether a power supply failure occurs (step S101). In other words, the controller 3 temporarily determines whether a failure occurs in the power supply system.

When the second system voltage V2 is equal to or smaller than the ground fault threshold, the controller 3 temporarily determines that a failure occurs in the power supply system. When the second system voltage V2 exceeds the ground fault threshold, the controller 3 determines that no failure occurs in the power supply system.

In response to determining that no power supply failure occurs (step S101, No), the controller 3 ends the process and starts the process again from step S101. In response to temporarily determining that a power supply failure occurs (step S101, Yes), the controller 3 turns off the inter-system connection unit 41 and turns on the battery switch 42 (step S102).

Thereafter, the controller 3 executes the main-determination of the power supply failure (step S103). Specifically, after the temporary determination, when the first system voltage V1 is equal to or smaller than the ground fault threshold for a predetermined time period or more and the second system voltage V2 exceeds the ground fault threshold within the predetermined time period, the controller 3 executes main-determination that a failure occurs in the main power supply 10.

After the temporary determination, when the second system voltage V2 is equal to or smaller than the ground fault threshold for a predetermined time period or more and the first system voltage V1 exceeds the ground fault threshold within the predetermined time period, the controller 3 executes main-determination that a failure occurs in the backup power supply 20.

After the temporary determination, when the first system voltage V1 and the second system voltage V2 exceed the ground fault threshold within a predetermined time period, the controller 3 determines that a result of the temporary determination is an error. That is, the controller 3 executes main-determination that no power supply failure occurs.

The controller 3 determines whether a result of the main-determination is a failure of the main power supply 10 (step S104). When the result of the main-determination is the failure of the main power supply 10 (step S104, Yes), the controller 3 turns off the first to fifth switches 30 to 34 (step S105). The controller 3 moves the process to step S108. Accordingly, the electric power from the backup power supply 20 is supplied to each of the loads 101 to 105 via the sixth to tenth switches 35 to 39, and the fail-safe control and the retreat travel control (FOP) using the backup power supply 20 are executed.

When the result of the main-determination is not the failure of the main power supply 10 (step S104, No), the controller 3 determines whether the result of the main-determination is a failure of the backup power supply 20 (step S106).

When the result of the main determination is the failure of the backup power supply 20 (step S106, Yes), the controller 3 turns off the battery switch 42, turns off the sixth to tenth switches 35 to 39 (step S107), and moves the process to step S108. Accordingly, the electric power from the main power supply 10 is supplied to each of the loads 101 to 105 via the first to fifth switches 30 to 34, and the fail-safe control and the retreat travel control (FOP) using the main power supply 10 are executed.

In step S108, the controller 3 notifies the autonomous driving control device 60 of the power supply system of the failed power supply, and ends the process. In response to the main-determination that the main power supply 10 fails, for example, the controller 3 notifies the autonomous driving control device 60 that a ground fault occurs in the first system line 110 including the main power supply 10 and that the fail-safe control by the backup power supply 20 is started.

In response to the main-determination that the backup power supply 20 fails, for example, the controller 3 notifies the autonomous driving control device 60 that a ground fault occurs in the second system line 120 including the backup power supply 20 and that the fail-safe control by the main power supply 10 is started.

When the result of the main-determination is neither the failure of the main power supply 10 nor the failure of the backup power supply 20 (step S106, No), the controller 3 turns off the battery switch 42 and turns on the inter-system connection unit 41 (step S109). That is, in response to the main-determination that no power supply failure occurs, the controller 3 turns off the battery switch 42 and turns on the inter-system connection unit 41. Accordingly, the battery switch 42 and the inter-system connection unit 41 return to their original normal states. The controller 3 ends the process and starts the process again from step S101.

[1-5-1. Process Executed by Controller of Power Supply Control Device when Main Power Supply Fails]

Next, a process executed by the controller 3 of the power supply control device 1 when the main power supply fails will be described. FIGS. 10 and 11 are flowcharts illustrating an example of the process executed when the main power supply fails.

The controller 3 of the power supply control device 1 executes the process illustrated in FIG. 10 and the like and executed when the main power supply fails in parallel with a power supply failure determination process illustrated in FIG. 9. For example, as illustrated in FIG. 10, the controller 3 determines whether the main power supply 10 fails (step S201).

In response to determining that the main power supply 10 does not fail (step S201, No), that is, when the backup power supply 20 fails, or when no power supply failure occurs, the controller 3 ends the process and starts the process again from step S201.

In response to determining that the main power supply 10 fails (step S201, Yes), the controller 3 executes a notification process (step S202). The notification process in step S202 will be described later with reference to FIG. 11.

Next, the controller 3 determines whether the SOC of the backup power supply 20 is equal to or smaller than the lower limit (here, 20%) (step S203). In response to determining that the SOC of the backup power supply 20 is not equal to or smaller than the lower limit (step S203, No), the controller 3 ends the process and starts the process again from step S201.

On the other hand, in response to determining that the SOC of the backup power supply 20 is equal to or smaller than the lower limit (step S203, Yes), the controller 3 ends the fail-safe control, and outputs the retreat travel end instruction to the controller 61 of the autonomous driving control device 60 (step S204). Specifically, the controller 3 stops the power supply of the electric power from the backup power supply 20 to each of the loads 101 to 105 by turning off the battery switch 42 and ending the fail-safe control. The controller 3 outputs the retreat travel end instruction to the autonomous driving control device 60, and thus the controller 61 of the autonomous driving control device 60 ends the retreat travel control.

As described above, when the SOC of the backup power supply 20 decreases to the lower limit (20%), the controller 3 ends the fail-safe control. Accordingly, since the SOC of the backup power supply 20 does not decrease to below the lower limit, it is possible to prevent the backup power supply 20 from being over-discharged and the battery from deteriorating.

Next, the notification process in step S202 will be described with reference to FIG. 11. As illustrated in FIG. 11, the controller 3 determines whether the retreat travel is completed (step S301). Information indicating that the retreat travel is completed is obtained from the autonomous driving control device. In response to determining that the retreat travel is not completed (step S301, No), the controller 3 determines whether the SOC of the backup power supply 20 decreases to or below the first threshold A1 (here, 40%) (step S302). Specifically, the process of step S302 is a process of determining whether, after the fail-safe control and the retreat travel control by the backup power supply 20 are started, the retreat travel is continued without the vehicle reaching a safe place, and the SOC gradually decreases to or below the first threshold A1. In response to determining that the retreat travel is completed (step S301, Yes), the controller 3 ends the process.

In response to determining that the SOC of the backup power supply 20 does not decrease to or below the first threshold A1 (step S302, No), the controller 3 returns to the process of step S301. Accordingly, when the retreat travel is completed before the SOC of the backup power supply 20 decreases to or below the first threshold A1, the controller 3 does not execute the processes of step S302 and the subsequent steps. On the other hand, in response to determining that the SOC of the backup power supply 20 decreases to or below the first threshold A1 (step S302, Yes), the controller 3 notifies in advance (notifies) the inside of the vehicle that the vehicle is likely to stop due to the shortage of the SOC of the backup power supply 20 (step S303). That is, the controller 3 executes the first notification.

Subsequently, the controller 3 notifies in advance (notifies) the outside of the vehicle that the vehicle is likely to stop due to the shortage of the SOC of the backup power supply 20 (step S304). That is, the controller 3 executes the fourth notification.

Although FIG. 11 illustrates an example in which the controller 3 executes the first notification to the inside of the vehicle and the fourth notification to the outside of the vehicle in this order, the present disclosure is not limited thereto. That is, the controller 3 may execute the fourth notification to the outside of the vehicle and the first notification to the inside of the vehicle in this order, or may execute the first notification and the fourth notification simultaneously.

Next, the controller 3 determines whether the retreat travel is completed (step S305). The information indicating that the retreat travel is completed is obtained from the autonomous driving control device as in step S301. In response to determining that the retreat travel is not completed (step S305, No), the controller 3 determines whether the SOC of the backup power supply 20 decreases to or below the second threshold A2 (here, 30%) (step S306). Specifically, the process of step S306 is a process of determining whether, after the first and third notifications are executed, the retreat travel is continued without the vehicle reaching a safe place, and the SOC gradually decreases to or below the second threshold A2. In response to determining in step S305 that the retreat travel is completed (step S305, Yes), the controller 3 ends the process.

When the controller 3 determines that the SOC of the backup power supply 20 does not decrease to or below the second threshold A2 (step S306, No), the controller 3 returns to step S305. Accordingly, although the SOC of the backup power supply 20 decreases to or below the first threshold A1, when the retreat travel is completed before the SOC decreases to the second threshold A2, the controller 3 does not execute the processes of step S306 and the subsequent steps. On the other hand, in response to determining that the SOC of the backup power supply 20 decreases to or below the second threshold A2 (step S306, Yes), the controller 3 notifies the inside of the vehicle that the vehicle stops due to the shortage of the SOC of the backup power supply 20 (step S307). That is, the controller 3 executes the third notification.

Subsequently, the controller 3 notifies the outside of the vehicle that the vehicle stops due to the shortage of the SOC of the backup power supply 20 (step S308). That is, the controller 3 executes the second notification.

Although FIG. 11 illustrates an example in which the controller 3 executes the third notification to the inside of the vehicle and the second notification to the outside of the vehicle in this order, the present disclosure is not limited thereto. That is, the controller 3 may execute the second notification to the outside of the vehicle and the third notification to the inside of the vehicle in this order, or may execute the second notification and the third notification simultaneously.

[1-6. Process Executed by Controller of Autonomous Driving Control Device]

Figure 12:
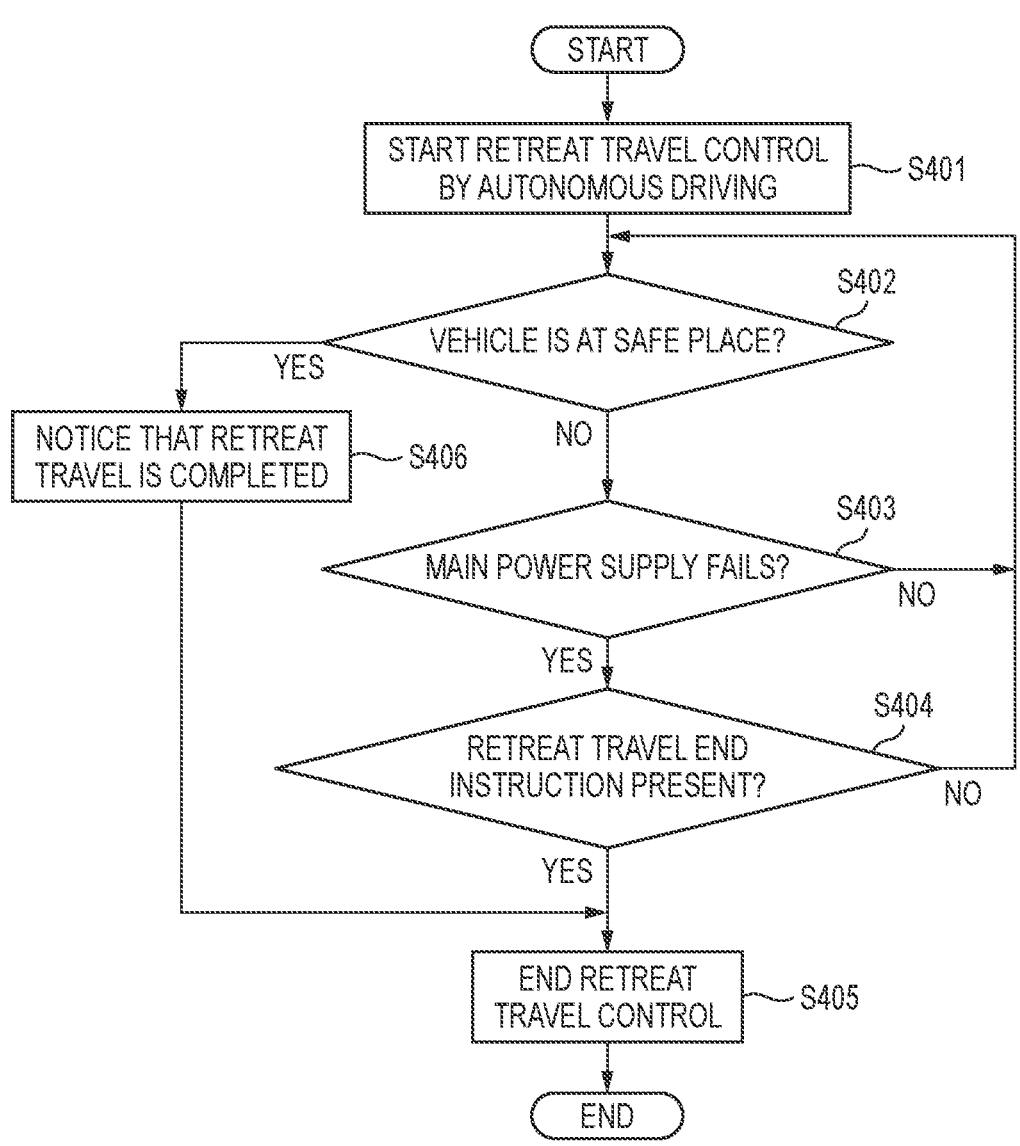
FIG. 12 is a flowchart illustrating an example of a process executed by the controller of an autonomous driving control device according to the first embodiment.

Next, a process executed by the controller 61 of the autonomous driving control device 60 according to the first embodiment will be described with reference to FIG. 12. FIG. 12 is a flowchart illustrating an example of the process executed by the controller 61 of the autonomous driving control device 60 according to the first embodiment. FIG. 12 illustrates a retreat travel process executed by the controller 61 of the autonomous driving control device 60 according to the first embodiment.

When the controller 61 is notified by the power supply control device 1 that the power supply fails and the fail-safe control is started, the controller 61 starts the retreat travel control by autonomous driving (step S401).

Next, the controller 61 determines whether the vehicle has stopped at a safe place using the map information and the GPS (step S402). In response to determining that the vehicle has not stopped at a safe place (step S402, No), the controller 61 determines whether the main power supply 10 fails based on the notification from the power supply control device 1 (step S403).

In response to determining that the main power supply 10 does not fail (step S403, No), that is, when the backup power supply 20 fails, the controller 61 returns to step S402 and executes the processes of step S402 and subsequent steps again. Specifically, when the backup power supply 20 fails, electric power or the like generated by the generator 12 is supplied to each of the loads 101 to 105 in the first system line 110, and the retreat travel is continued.

On the other hand, in response to determining that the main power supply 10 fails (step S403, Yes), the controller 61 determines whether the retreat travel end instruction is output from the controller 3 of the power supply control device 1 (step S404).

In response to determining that the retreat travel end instruction is not output (step S404, No), the controller 61 returns to step S402 and executes the processes of step S402 and the subsequent steps again.

On the other hand, in response to determining that the retreat travel end instruction is output (step S404, Yes), the controller 61 ends the retreat travel control (step S405), in other words, stops the vehicle. As described above, the retreat travel end instruction is output from the power supply control device 1 when the SOC of the backup power supply 20 is equal to or smaller than the lower limit (20%).

In response to determining that the vehicle has stopped at a safe place (step S402, Yes), the controller 61 notifies the controller 3 of the power supply control device 1 that the retreat travel is completed (step S406), and ends the retreat travel control in the process of step S405.

As described above, the power supply control device (an example of the control device) 1 according to the first embodiment includes the controller 3 mounted on the vehicle having an autonomous driving function and configured to execute the fail-safe control by the backup power supply 20 when the main power supply 10 fails. In the fail-safe control, when the remaining charge level (SOC) of the backup power supply 20 decreases to or below the first threshold A1 set in advance, the controller 3 executes the first notification to notify in advance the inside of the vehicle that the vehicle is likely to stop due to the shortage of the remaining charge level of the backup power supply 20. When the remaining charge level of the backup power supply 20 decreases to or below the second threshold A2 that is smaller than the first threshold A1, the controller 3 executes the second notification to notify the outside of the vehicle that the vehicle stops. Accordingly, it is possible to reduce the sense of uneasiness given to the user when the vehicle stops.

2. SECOND EMBODIMENT

Figure 13:
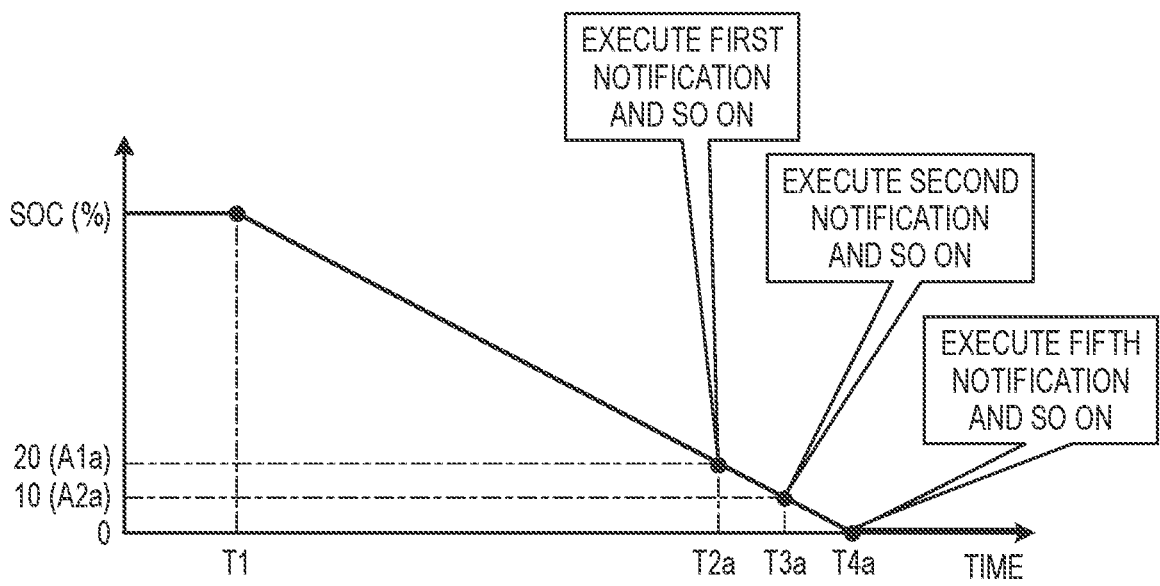
FIG. 13 is a diagram illustrating a state of a remaining charge level of a backup power supply during fail-safe control executed by a power supply control device according to a second embodiment.

Next, the power supply control device 1 according to a second embodiment will be described with reference to FIG. 13. FIG. 13 is a diagram illustrating a state of a remaining charge level (SOC) of the backup power supply 20 during fail-safe control executed by the power supply control device 1 according to the second embodiment. In the following description, the same components as those of the first embodiment are denoted by the same reference numerals, and the description thereof is omitted.

In the second embodiment, a lower limit, which is a value for forcibly ending the retreat travel, is set to 0%. Therefore, in the second embodiment, when the vehicle does not reach a safe place during the retreat travel, the retreat travel is continued until the SOC of the backup power supply 20 becomes 0% which is the lower limit.

In the second embodiment, a first threshold A1*a* is set in advance to a value (for example, 20%) larger than the lower limit (0%). A second threshold A2*a* is set to a value (for example, 10%) smaller than the first threshold A1*a* (20%) and larger than the lower limit (0%).

In the above description, although the first and second thresholds A1*a* and A2*a* are indicated by specific numerical values, those are merely examples and are not limited thereto, and can be set to any values.

In the second embodiment, when the main power supply 10 fails at the time T1, the controller 3 starts the fail-safe control. When the SOC of the backup power supply 20 decreases to or below the first threshold A1*a* (20%) (see a time T2*a*), the controller 3 executes a first notification or the like to notify in advance the inside of the vehicle that the vehicle is likely to stop due to the shortage of the SOC of the backup power supply 20.

Subsequently, when the SOC of the backup power supply 20 further decreases to or below the second threshold A2*a* (see a time T3*a*), the controller 3 executes a second notification or the like to notify the outside of the vehicle that the vehicle stops.

Subsequently, when the SOC of the backup power supply 20 decreases to the lower limit (0%) (see a time T4*a*), the controller 3 ends the fail-safe control. That is, the controller 3 stops the power supply from the backup power supply 20 to each of the loads 101 to 105 by turning off the battery switch 42. The controller 3 outputs a retreat travel end instruction to the controller 61 of the autonomous driving control device 60. Upon receiving the retreat travel end instruction, the controller 61 ends the retreat travel control. When the fail-safe control and the retreat travel control end, the vehicle stops.

As described above, in the second embodiment, by setting the lower limit to 0%, it is possible to continue the retreat travel as long as possible by using the electric power from the backup power supply 20 as much as possible.

However, since the SOC of the backup power supply 20 is 0% of the lower limit at a time point (see the time T4*a*) when the retreat travel ends, the vehicle cannot be moved from the stopped position. In other words, the vehicle is in an immovable state, more specifically, in an immovable state due to a failure of the main power supply 10.

When the SOC of the backup power supply 20 becomes 0% and the vehicle stops, the controller 3 according to the second embodiment executes a fifth notification to notify the outside of the vehicle that the vehicle is immovable due to the failure of the main power supply 10.

In the fifth notification, the controller 3 controls the out-of-vehicle notification device 80 to notify the outside of the vehicle that the vehicle is immovable due to the failure of the main power supply 10. Specifically, the controller 3 notifies the outside of the vehicle that the vehicle is immovable by, for example, sounding a horn of the out-of-vehicle notification device 80 for a relatively long time, or blinking at least one of a hazard lamp, a headlamp, and a tail lamp at a high speed.

Accordingly, by the controller 3, a person outside the vehicle may recognize that the vehicle is immovable. Therefore, the person outside the vehicle may pay attention to the vehicle that is immovable and stops, and thus the sense of uneasiness given to the user of the vehicle due to the fact that the vehicle is immovable and stops may be reduced.

In the fifth notification, the controller 3 may notify an external center (an emergency notification center) that the vehicle is immovable due to the failure of the main power supply 10. Accordingly, by notifying the external center (the emergency notification center) instead of the user of the vehicle who is likely to be confused by the immovable vehicle, the controller 3 may take an appropriate countermeasure to the stop of the vehicle, and the sense of uneasiness of the user may be reduced.

In the second notification, the fourth notification, and the fifth notification, it is preferable that operation contents of the out-of-vehicle notification device 80 be different from each other. For example, the operation content of the out-of-vehicle notification device 80 in the fifth notification to notify that the vehicle is immovable may be an operation content for calling attention to a person outside the vehicle, as compared with the operation content of the out-of-vehicle notification device 80 in the second or fourth notification. For example, when the notification is executed to the outside of the vehicle by blinking the hazard lamp, a blinking cycle is shortened in the order of the second notification, the fourth notification, and the fifth notification.

Figure 14:
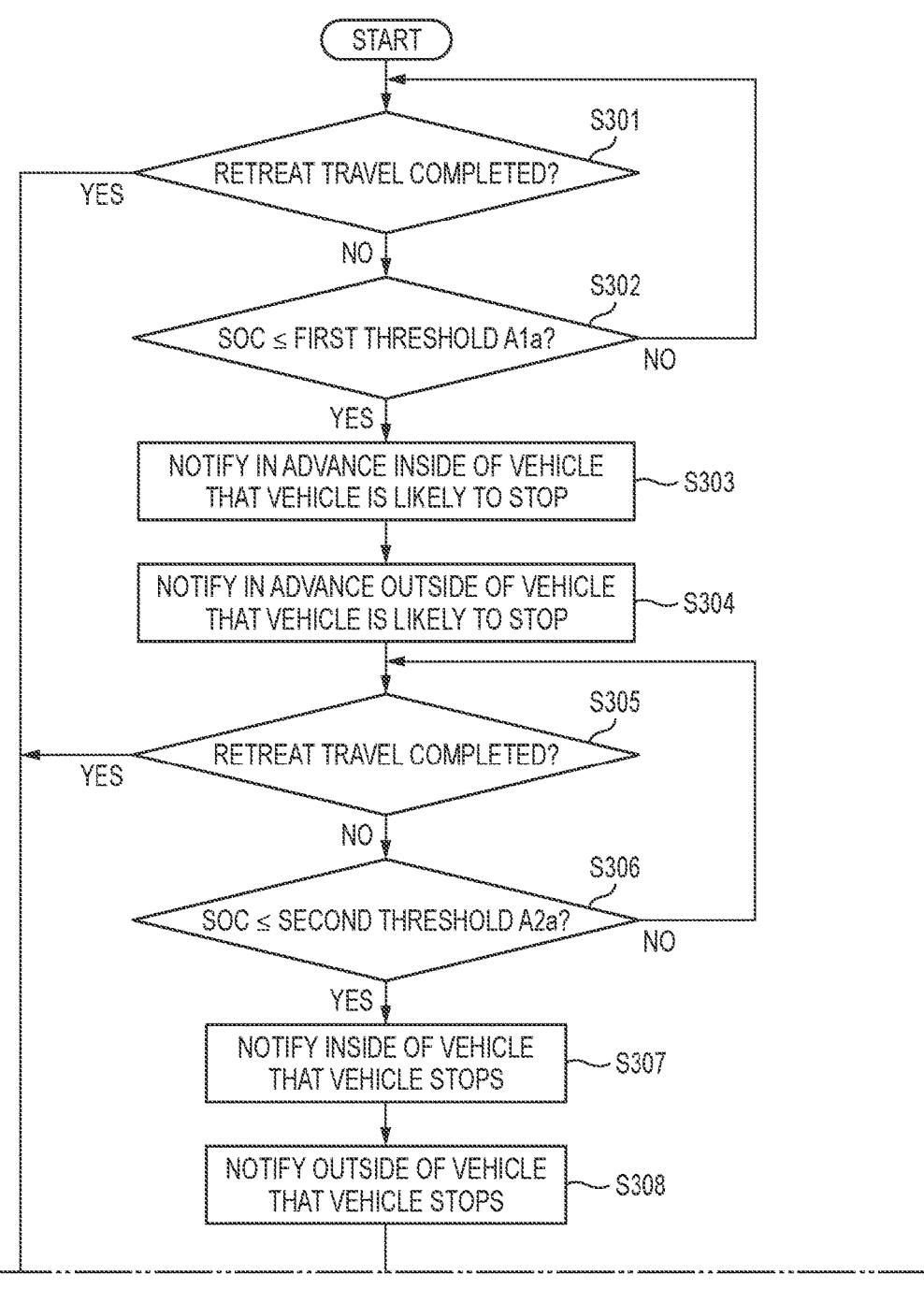
FIG. 14 is a flowchart illustrating an example of a notification process according to the second embodiment.

Next, a notification process executed by the controller 3 of the power supply control device 1 according to the second embodiment will be described with reference to FIG. 14. FIG. 14 is a flowchart illustrating an example of a notification process according to the second embodiment.

As illustrated in FIG. 14, after the process in step S308, the controller 3 determines whether the retreat travel is completed (step S309). Information indicating that the retreat travel is completed is obtained from the autonomous driving control device as in steps S301 and S305. In response to determining that the retreat travel is not completed (step S309, No), the controller 3 determines whether the vehicle has stopped in a state where the SOC of the backup power supply 20 is 0% (step S310). In response to determining that the vehicle has stopped in the state where the SOC of the backup power supply 20 is 0% (step S310, Yes), the controller 3 notifies the outside of the vehicle that the vehicle is immovable due to the failure of the main power supply 10 (step S311). That is, the controller 3 executes the fifth notification. In response to determining that the retreat travel is completed (step S309, Yes), the controller 3 ends the process.

On the other hand, in response to determining that the vehicle does not stop in a state where the SOC of the backup power supply 20 is 0% (step S310, No), the controller 3 returns to the process of step S309. Accordingly, when the retreat travel is completed until the vehicle stops in the state where the SOC of the backup power supply 20 is 0%, the controller 3 does not execute the processes of step S310 and the subsequent steps.

3. THIRD EMBODIMENT

Next, the power supply control device 1 according to a third embodiment will be described. The backup power supply 20 is in a charging state in which an assumed time period (20 seconds) during which retreat travel can be completed can be secured. However, depending on a surrounding situation of the vehicle, the SOC of the backup power supply 20 decreases more than expected and decreases to a lower limit for forcibly ending the retreat travel, and thus the retreat travel may not be completed. The surrounding situation of the vehicle includes a congestion situation of a road on which the vehicle travels, an ambient temperature (an environmental temperature) of the vehicle, and the like.

Specifically, when congestion (traffic jam) occurs on the road on which the vehicle travels, a traveling time period longer than expected is required until the vehicle during retreat travel reaches a safe place. When the traveling time period becomes longer than expected, the SOC of the backup power supply 20 decreases more than expected and reaches the lower limit, and as a result, the retreat travel may not be completed.

Performance of the backup power supply 20 may be influenced by an ambient temperature. For example, when the ambient temperature is extremely low, the performance of the backup power supply 20 may deteriorate. Therefore, for example, when the ambient temperature of the vehicle reaches a predetermined temperature at which the performance of the backup power supply 20 decreases in a cold region or the like, the SOC of the backup power supply 20 decreases more than expected and reaches the lower limit, and as a result, the retreat travel may not be completed.

Thus, the controller 3 of the power supply control device 1 according to the third embodiment executes a notification process when there is a possibility that the surrounding situation such as the congestion situation of the road on which the vehicle travels, the ambient temperature of the vehicle, or the like influences the retreat travel and the retreat travel cannot be completed.

Figure 15:
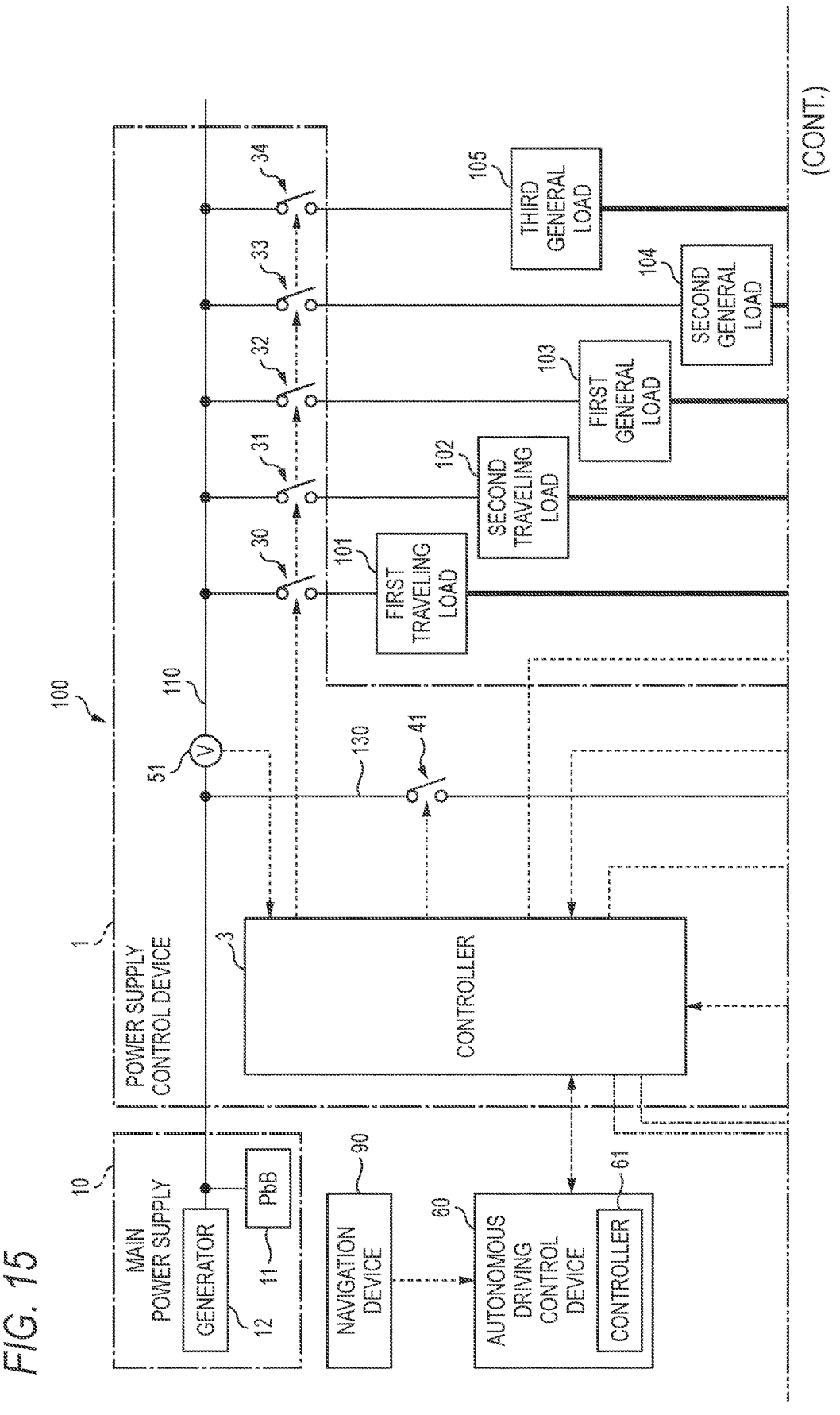
FIG. 15 is a diagram illustrating a configuration example of a control system according to a third embodiment.

Hereinafter, the third embodiment will be described with reference to FIG. 15 and the like. FIG. 15 is a diagram illustrating a configuration example of the control system 100 according to the third embodiment. As illustrated in FIG. 15, the power supply control device 1 is communicably connected to the navigation device 90 in addition to the autonomous driving control device 60 and the like.

The power supply control device 1 obtains, from the navigation device 90, road traffic information including the presence or absence of congestion (traffic jam) in the road on which the vehicle travels. The power supply control device 1 may obtain the road traffic information from the autonomous driving control device 60 or may obtain the road traffic information from an external server (not illustrated).

The second traveling load 102 according to the third embodiment includes a temperature sensor that detects the ambient temperature of the vehicle. Such a temperature sensor is an electrical load necessary for retreat travel of the vehicle. The temperature sensor which is the second traveling load 102 detects the ambient temperature of the vehicle, and outputs information indicating the detected ambient temperature to the controller 3 of the power supply control device 1. The power supply control device 1 may obtain information indicating the ambient temperature of the vehicle from an external server (not illustrated).

Figure 16:
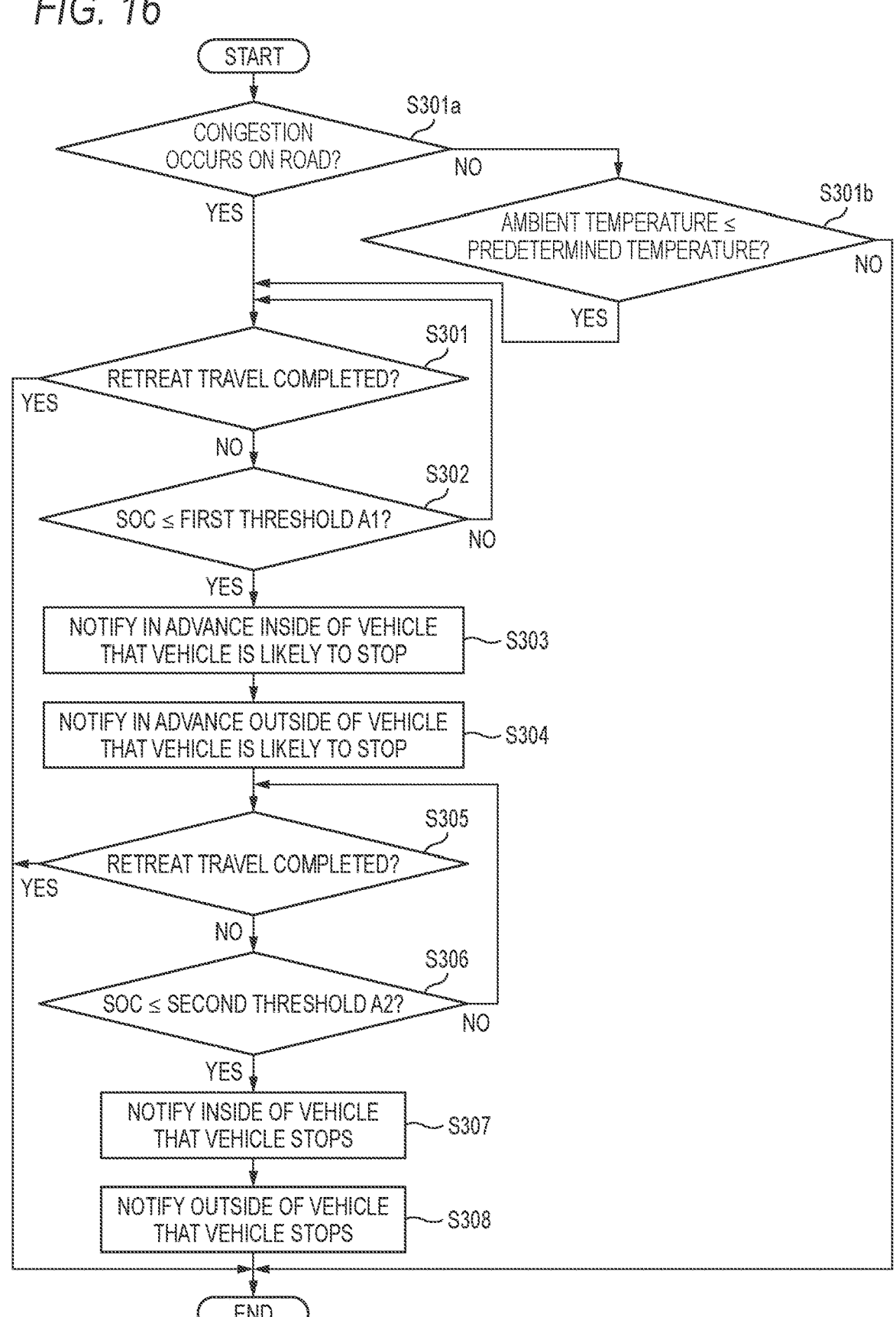
FIG. 16 is a flowchart illustrating an example of a notification process according to the third embodiment.

Next, a notification process executed by the controller 3 of the power supply control device 1 according to the third embodiment will be described with reference to FIG. 16. FIG. 16 is a flowchart illustrating an example of a notification process according to the third embodiment.

As illustrated in FIG. 16, the controller 3 determines whether congestion occurs on a traveling road of the vehicle based on the road traffic information (step S301*a*). In response to determining that congestion occurs on the traveling road of the vehicle (step S301*a*, Yes), the controller 3 proceeds to the processes of step S301 and the subsequent steps. After S301, the process of step S303 for executing the first notification and the process of step S308 for executing the second notification are executed.

That is, the controller 3 according to the third embodiment executes the notification process including the first notification and the second notification when congestion occurs on the traveling road of the vehicle. In other words, when there is a possibility that the surrounding situation of the vehicle such as congestion of the traveling road of the vehicle influences the retreat travel and the retreat travel cannot be completed, the controller 3 executes the notification process. Conversely, when the surrounding situation of the vehicle such as the congestion of the traveling road of the vehicle hardly influences the retreat travel, the controller 3 does not execute the notification process.

As described above, by executing the notification process when there is a possibility that the retreat travel cannot be completed due to the congestion of the traveling road of the vehicle, the controller 3 may prevent unnecessary notification to the inside or the outside of the vehicle. The controller 3 may reduce a process load in the notification process as compared with a case where a process for comparing the SOC of the backup power supply 20 with the first threshold A1 (or the second threshold A2) is constantly executed.

In response to determining that no congestion occurs on the traveling road of the vehicle (step S301*a*, No), the controller 3 determines whether the ambient temperature of the vehicle is equal to or lower than a predetermined temperature based on an output from the temperature sensor (step S301*b*). The predetermined temperature is set in advance to a value at which the performance of the backup power supply 20 decreases through experiments or the like, but is not limited thereto, and may be set to any value.

In response to determining that the ambient temperature of the vehicle is not equal to or lower than the predetermined temperature (step S301*b*, No), the controller 3 skips the subsequent processes and ends the process. On the other hand, in response to determining that the ambient temperature of the vehicle is equal to or lower than the predetermined temperature (step S301*b*, Yes), the controller 3 proceeds to the processes of step S301 and the subsequent steps.

That is, the controller 3 according to the third embodiment executes the notification process including the first notification and the second notification when the ambient temperature of the vehicle is equal to or lower than the predetermined temperature. In other words, when there is a possibility that the surrounding situation of the vehicle such as the ambient temperature of the vehicle being equal to or lower than the predetermined temperature influences the retreat travel and the retreat travel cannot be completed, the controller 3 executes the notification process. Conversely, when the surrounding situation of the vehicle such as the ambient temperature of the vehicle being not equal to or lower than the predetermined temperature hardly influences the retreat travel, the controller 3 does not execute the notification process.

As described above, by executing the notification process when there is a possibility that the retreat travel cannot be completed due to the influence of the ambient temperature (the environmental temperature) of the vehicle, the controller 3 may prevent unnecessary notification to the inside or the outside of the vehicle. The controller 3 may reduce a process load in the notification process as compared with the case where the process for comparing the SOC of the backup power supply 20 with the first threshold A1 (or the second threshold A2) is constantly executed.

In the above description, the notification process is executed when congestion occurs on the traveling road of the vehicle or when the ambient temperature of the vehicle is equal to or lower than the predetermined temperature, but the present disclosure is not limited thereto. That is, the notification process may be executed when congestion occurs on the traveling road of the vehicle and the ambient temperature of the vehicle is equal to or lower than the predetermined temperature.

In the above example, the surrounding situation of the vehicle that influences the retreat travel includes the congestion situation of the road, the ambient temperature of the vehicle, and the like, but the present disclosure is not limited thereto. That is, the surrounding situation of the vehicle that influences the retreat travel may include other situations such as the distance from the current location of the vehicle to the safe retreat place and weather around the vehicle.

In each of the above-described embodiments, an example in which the notification process is executed when the main power supply 10 fails and the fail-safe control and the retreat travel control are executed by the backup power supply 20 has been described, but the present disclosure is not limited thereto. That is, when the backup power supply 20 fails and the fail-safe control by the main power supply 10 and the retreat travel control are executed, the notification process may be executed.

4. APPENDIX

As an appendix, the features of the present disclosure are illustrated below.

(1) A control device including:

a controller mounted on a vehicle having an autonomous driving function and configured to execute fail-safe control by a backup power supply when a main power supply fails, in which the controller is configured to in the fail-safe control, when a remaining charge level of the backup power supply decreases to or below a first threshold set in advance, execute a first notification to notify in advance an inside of the vehicle that the vehicle is likely to stop due to a shortage of the remaining charge level of the backup power supply, and when the remaining charge level of the backup power supply decreases to or below a second threshold that is smaller than the first threshold, execute a second notification to notify an outside of the vehicle that the vehicle stops.

(2) The control device according to (1), in which the controller is configured to when the remaining charge level of the backup power supply decreases to or below the second threshold, execute a third notification to notify the inside of the vehicle that the vehicle stops.

(3) The control device according to (2), in which the first notification is an advance notification indicating that the vehicle is likely to stop, and the third notification is a confirmation notification indicating that the stop of the vehicle is confirmed.

(4) The control device according to any one of (1) to (3), in which the controller is configured to when the remaining charge level of the backup power supply decreases to or below the first threshold, execute a fourth notification to notify in advance the outside of the vehicle that the vehicle is likely to stop due to the shortage of the remaining charge level of the backup power supply.

(5) The control device according to any one of (1) to (4), in which the controller is configured to when the remaining charge level of the backup power supply becomes 0 and the vehicle stops, execute a fifth notification to notify an outside of the vehicle that the vehicle is immovable due to a failure of the main power supply.

(6) The control device according to any one of (1) to (5), in which the controller is configured to when congestion occurs on a traveling road of the vehicle, execute a notification process including the first notification and the second notification.

(7) The control device according to any one of (1) to (6), in which the controller is configured to when an ambient temperature of the vehicle is equal to or lower than a temperature at which performance of the backup power supply deteriorates, execute a notification process including the first notification and the second notification.

(8) A control method executed by a controller mounted on a vehicle having an autonomous driving function and configured to execute fail-safe control by a backup power supply when a main power supply fails, the control method comprising:

in the fail-safe control, when a remaining charge level of the backup power supply decreases to or below a first threshold set in advance, executing a first notification to notify in advance an inside of the vehicle that the vehicle is likely to stop due to a shortage of the remaining charge level of the backup power supply; and when the remaining charge level of the backup power supply decreases to or below a second threshold that is smaller than the first threshold, executing a second notification to notify an outside of the vehicle that the vehicle stops.

Further effects and modifications can be easily derived by those skilled in the art. Therefore, broader aspects of the present disclosure are not limited to the specific details and representative embodiments illustrated and described above. Therefore, various modifications can be made without departing from the spirit or scope of the general inventive concept as defined by the appended claims and equivalents thereof.

The invention claimed is:

1. A power supply control device for a power supply system of a vehicle that is capable of performing a retreat travel driving operation in which the vehicle, upon occurrence of an abnormality of the vehicle during an autonomous driving operation of the vehicle, autonomously travels to a safe place and then stops travelling, the power supply system of the vehicle including a main power supply for the autonomous driving operation and a backup power supply for the retreat travel driving operation, the power supply control device comprising:

a controller configured to execute the following operations:

(a) transmit a first instruction to an in-vehicle notification device to notify, when performing the retreat travel driving operation, that a remaining charge level of the backup power supply decreases to or below a first threshold;

(b) transmit a second instruction to an out-of-vehicle notification device to notify, when performing the retreat travel driving operation, that the vehicle will stop, when the remaining charge level of the backup power supply decreases to or below a second threshold that is lower than the first threshold; and (c) control a battery switch to stop supplying electric power from the backup power supply to a traveling load and transmit a retreat travel end instruction to an autonomous driving control device of the vehicle to stop performance of the retreat travel driving operation when the remaining charge level of the backup power supply decreases to or below a third threshold that is lower than the second threshold.

2. The power supply control device according to claim 1, wherein the controller is configured to transmit to the in-vehicle notification device a third instruction to notify that the vehicle will stop when the remaining charge level of the backup power supply decreases to or below the second threshold.

3. The power supply control device according to claim 2, wherein the first instruction causes the in-vehicle notification device to output an advance notification indicating that the vehicle is likely to stop; and the third instruction causes the in-vehicle notification device to output a confirmation notification indicating that the vehicle will stop.

4. The power supply control device according to claim 1, wherein the controller is configured to transmit to the out-of-vehicle notification device a fourth instruction that causes the out-of-vehicle notification device to output a notification that the vehicle is likely to stop due to the shortage of the remaining charge level of the backup power supply when the remaining charge level of the backup power supply decreases to or below the first threshold.

5. The power supply control device according to claim 2, wherein the controller is configured to transmit to the out-of-vehicle notification device a fourth instruction that causes the out-of-vehicle notification device to output a notification that the vehicle is likely to stop due to the shortage of the remaining charge level of the backup power supply when the remaining charge level of the backup power supply decreases to or below the first threshold.

6. The power supply control device according to claim 1, wherein the controller is configured to transmit to the out-of-vehicle notification device a fifth instruction to notify that the vehicle is immovable due to a failure of the main power supply when the remaining charge level of the backup power supply becomes 0 and the vehicle is stopped.

7. The power supply control device according to claim 2, wherein the controller is configured to transmit to the out-of-vehicle notification device a fifth instruction to notify that the vehicle is immovable due to a failure of the main power supply when the remaining charge level of the backup power supply becomes 0 and the vehicle is stopped.

8. The power supply control device according to claim 4, wherein the controller is configured to transmit to the out-of-vehicle notification device a fifth instruction to notify that the vehicle is immovable due to a failure of the main power supply when the remaining charge level of the backup power supply becomes 0 and the vehicle is stopped.

9. The power supply control device according to claim 1, wherein the controller is configured to execute the operations (a), (b) and (c) when congestion occurs on a traveling road of the vehicle.

10. The power supply control device according to claim 2, wherein the controller is configured to execute the operations (a), (b) and (c) when congestion occurs on a traveling road of the vehicle.

11. The power supply control device according to claim 4, wherein the controller is configured to execute the operations (a), (b) and (c) when congestion occurs on a traveling road of the vehicle.

12. The power supply control device according to claim 6, wherein the controller is configured to execute the operations (a), (b) and (c) when congestion occurs on a traveling road of the vehicle.

13. The power supply control device according to claim 1, wherein the controller is configured to execute the operations (a), (b) and (c) when an ambient temperature of the vehicle is equal to or lower than a temperature at which performance of the backup power supply deteriorates.

14. The power supply control device according to claim 2, wherein the controller is configured to execute the operations (a), (b) and (c) when an ambient temperature of the vehicle is equal to or lower than a temperature at which performance of the backup power supply deteriorates.

15. The power supply control device according to claim 4, wherein the controller is configured to execute the operations (a), (b) and (c) when an ambient temperature of the vehicle is equal to or lower than a temperature at which performance of the backup power supply deteriorates.

16. The power supply control device according to claim 6, wherein the controller is configured to execute the operations (a), (b) and (c) when an ambient temperature of the vehicle is equal to or lower than a temperature at which performance of the backup power supply deteriorates.

17. The power supply control device according to claim 9, wherein the controller is configured to execute the operations (a), (b) and (c) when an ambient temperature of the vehicle is equal to or lower than a temperature at which performance of the backup power supply deteriorates.

18. A power supply control method for a power supply system of a vehicle that is capable of performing a retreat travel driving operation in which the vehicle, upon occurrence of an abnormality of the vehicle during an autonomous driving operation of the vehicle, autonomously travels to a safe place and then stops travelling, the power supply system of the vehicle including a main power supply for the autonomous driving operation and a backup power supply for the retreat travel driving operation, the power supply control method being executed by a controller mounted on the vehicle and comprising:

(a) transmitting a first instruction to an in-vehicle notification device to notify, when performing the retreat travel driving operation, that a remaining charge level of the backup power supply decreases to or below a first threshold;

(b) transmitting a second instruction to an out-of-vehicle notification device to notify, when performing the retreat travel driving operation, that the vehicle will stop, when the remaining charge level of the backup power supply decreases to or below a second threshold that is lower than the first threshold; and (c) controlling a battery switch to stop supplying electric power from the backup power supply to a traveling load and transmitting a retreat travel end instruction to an autonomous driving control device of the vehicle to stop performance of the retreat travel driving operation when the remaining charge level of the backup power supply decreases to or below a third threshold that is lower than the second threshold.

19. A control system of a vehicle, the control system comprising:

an autonomous driving control device;

a main power supply;

a backup power supply;

an in-vehicle notification device;

an out-of-vehicle notification device; and a power supply control device, wherein the autonomous driving control device is configured to control the vehicle to execute a retreat travel operation in which the vehicle autonomously travels to a safe place and stops travelling upon reaching the safe place, the retreat travel operation being executed in response to the autonomous driving control device receiving a notification indicating that fail-safe control is being executed due to an abnormality of the vehicle, the autonomous driving control device is further configured to stop the vehicle in response to receiving an instruction to end the retreat travel operation before reaching the safe place during execution of the retreat travel operation, and the power supply control device comprises:

a first system line configured to supply electric power from the main power supply to a first traveling load, a second system line configured to supply electric power from the backup power supply to a second traveling load via a battery switch;

a connection device configured to selectively connect and disconnect the first system line and the second system line to/from each other; and a controller configured to execute the fail-safe control by controlling the connection device to disconnect the first system line from the second system line and by controlling the battery switch to connect the backup power supply to the second traveling load when a voltage of the first system line decreases to or below a ground fault threshold, and to transmit to the autonomous driving control device the notification indicating that the fail-safe control is being executed, and the controller is configured to execute the following operations:

(a) transmit to the in-vehicle notification device an instruction to notify an inside of the vehicle that the vehicle is likely to stop due to a shortage of a remaining charge level of the backup power supply when the remaining charge level of the backup power supply decreases to or below a first threshold before the vehicle reaches the safe place and stops, (b) transmit to the out-of-vehicle notification device an instruction to notify an outside of the vehicle that the vehicle will stop when the remaining charge level of the backup power supply decreases to or below a second threshold that is lower than the first threshold before the vehicle reaches the safe place and stops, and (c) stop supplying electric power to the second traveling load by controlling the battery switch to disconnect the backup power supply from the second travelling load and transmit the instruction to end the retreat travel operation to the autonomous driving control device when the remaining charge level of the backup power supply decreases to or below a third threshold that is lower than the second threshold.

* * * * *